US008315271B2

(12) United States Patent
Nanda et al.

(10) Patent No.: US 8,315,271 B2
(45) Date of Patent: Nov. 20, 2012

(54) METHOD AND APPARATUS FOR AN AD-HOC WIRELESS COMMUNICATIONS SYSTEM

(75) Inventors: Sanjiv Nanda, Ramona, CA (US); Jay Rodney Walton, Carlisle, MA (US)

(73) Assignee: Qualcomm Incorporated, San Diego, CA (US)

( * ) Notice: Subject to any disclaimer, the term of this patent is extended or adjusted under 35 U.S.C. 154(b) by 1728 days.

(21) Appl. No.: 11/088,382

(22) Filed: Mar. 23, 2005

(65) Prior Publication Data

US 2006/0227801 A1 Oct. 12, 2006

Related U.S. Application Data

(60) Provisional application No. 60/556,965, filed on Mar. 26, 2004, provisional application No. 60/576,545, filed on Jun. 2, 2004, provisional application No. 60/586,841, filed on Jul. 8, 2004, provisional application No. 60/600,960, filed on Aug. 11, 2004.

(51) Int. Cl.
*H04L 12/42* (2006.01)
*H04L 12/403* (2006.01)
*H04L 12/413* (2006.01)

(52) U.S. Cl. ........ 370/450; 370/328; 370/461; 370/462; 370/447

(58) Field of Classification Search .................. 370/278, 370/282, 322, 348, 450, 453, 461, 445
See application file for complete search history.

(56) References Cited

U.S. PATENT DOCUMENTS

| | | | |
|---|---|---|---|
| 4,747,100 A * | 5/1988 | Roach et al. | 370/452 |
| 4,750,171 A | 6/1988 | Kedar et al. | |
| 5,081,623 A * | 1/1992 | Ainscow | 370/451 |
| 5,133,081 A | 7/1992 | Mayo | |
| 5,276,703 A | 1/1994 | Budin et al. | |

(Continued)

FOREIGN PATENT DOCUMENTS

CN 1263675 8/2000

(Continued)

OTHER PUBLICATIONS

"A wireless token ring protocol for ad-hoc networks." Aerospace Conference Proceedings, 2002. IEEE vol. 3, On pp. 3-1219-3-1228 vol. 3.*

(Continued)

*Primary Examiner* — Matthew Sams
(74) *Attorney, Agent, or Firm* — Qualcomm Patent Group; Rupit Patel; James H. Yancey, Jr.

(57) ABSTRACT

An IBSS that allows token passing for round-robin service of QoS flows is disclosed (an RRBSS). The RRBSS permits low-latency, reduced contention, distributed scheduling useful in any ad hoc network, but particularly suitable for high data rates. Distributed scheduled access is provided for flows through a round-robin token passing service discipline. STAs follow a round-robin order, or list, and are able to communicate with round-robin transmit opportunities during a defined period. Each STA in the list transmits a respective token to transfer access to the shared medium to the next STA in the RR List. The sequence is terminated with an end token. STAs maintain station identifiers and list updates are maintained with a sequence identifier. Techniques are disclosed to add and remove STAs to the sequence; establish connectivity lists (receive and forward), and maintain other sequence parameters such as bandwidth management and TXOP duration. Various other aspects are also disclosed.

41 Claims, 20 Drawing Sheets

U.S. PATENT DOCUMENTS

| | | | |
|---|---|---|---|
| 5,280,476 A | 1/1994 | Kojima et al. |
| 5,297,144 A | 3/1994 | Gilbert et al. |
| 5,384,777 A | 1/1995 | Ahmadi et al. |
| 5,444,702 A | 8/1995 | Burnett et al. |
| 5,638,371 A | 6/1997 | Raychaudhuri et al. |
| 5,677,909 A | 10/1997 | Heide |
| 5,684,791 A * | 11/1997 | Raychaudhuri et al. ... 370/310.2 |
| 5,719,868 A | 2/1998 | Young |
| 5,729,542 A | 3/1998 | Dupont |
| 5,818,842 A | 10/1998 | Burwell et al. |
| 5,923,650 A | 7/1999 | Chen et al. |
| 5,970,059 A | 10/1999 | Ahopelto et al. |
| 5,974,045 A | 10/1999 | Ohkura et al. |
| 6,002,691 A | 12/1999 | Citta et al. |
| 6,014,087 A | 1/2000 | Krishnakumar et al. |
| 6,069,886 A | 5/2000 | Ayerst et al. |
| 6,098,142 A | 8/2000 | Leggett et al. |
| 6,111,927 A | 8/2000 | Sokoler |
| 6,130,886 A | 10/2000 | Ketseoglou et al. |
| 6,252,854 B1 | 6/2001 | Hortensius et al. |
| 6,256,317 B1 | 7/2001 | Holloway et al. |
| 6,307,846 B1 | 10/2001 | Willey |
| 6,404,751 B1 | 6/2002 | Roark et al. |
| 6,433,737 B2 | 8/2002 | Katz |
| 6,438,104 B1 | 8/2002 | Fodor et al. |
| 6,452,917 B1 | 9/2002 | Leung |
| 6,456,599 B1 * | 9/2002 | Elliott ............ 370/254 |
| 6,483,819 B1 | 11/2002 | Take et al. |
| 6,504,506 B1 | 1/2003 | Thomas et al. |
| 6,512,773 B1 | 1/2003 | Scott |
| 6,532,225 B1 | 3/2003 | Chang et al. |
| 6,542,490 B1 | 4/2003 | Ahmadvand et al. |
| 6,553,020 B1 | 4/2003 | Hughes et al. |
| 6,563,816 B1 | 5/2003 | Nodoushani et al. |
| 6,574,237 B1 | 6/2003 | Bullman et al. |
| 6,580,704 B1 | 6/2003 | Wellig et al. |
| 6,587,441 B1 | 7/2003 | Urban et al. |
| 6,600,754 B1 | 7/2003 | Young et al. |
| 6,609,866 B2 | 8/2003 | Huang et al. |
| 6,611,525 B1 | 8/2003 | Natanson et al. |
| 6,611,529 B1 | 8/2003 | Krishnakumar et al. |
| 6,621,805 B1 | 9/2003 | Kondylis et al. |
| 6,621,827 B1 | 9/2003 | Rezvani et al. |
| 6,625,171 B1 | 9/2003 | Matsudo |
| 6,633,564 B1 | 10/2003 | Steer et al. |
| 6,643,260 B1 | 11/2003 | Kloth et al. |
| 6,671,511 B1 | 12/2003 | Forssell et al. |
| 6,724,740 B1 | 4/2004 | Choi et al. |
| 6,768,730 B1 | 7/2004 | Whitehill |
| 6,788,702 B1 | 9/2004 | Garcia-Luna-Aceves et al. |
| 6,791,962 B2 | 9/2004 | Wentink |
| 6,791,996 B1 | 9/2004 | Watanabe et al. |
| 6,795,409 B1 | 9/2004 | Youssefmir et al. |
| 6,795,418 B2 | 9/2004 | Choi |
| 6,813,260 B1 | 11/2004 | Fogle |
| 6,847,626 B1 | 1/2005 | Carneal et al. |
| 6,868,133 B2 | 3/2005 | Hicks et al. |
| 6,898,441 B1 | 5/2005 | Kogiantis et al. |
| 6,907,020 B2 | 6/2005 | Periyalwar et al. |
| 6,912,225 B1 | 6/2005 | Kohzuki et al. |
| 6,944,688 B1 | 9/2005 | Batcher |
| 6,961,311 B2 | 11/2005 | Rakotoarivelo et al. |
| 6,963,549 B1 | 11/2005 | Jayaraman et al. |
| 6,977,944 B2 | 12/2005 | Brockmann et al. |
| 7,006,848 B2 | 2/2006 | Ling et al. |
| 7,031,274 B2 | 4/2006 | Sherman |
| 7,031,287 B1 | 4/2006 | Ho et al. |
| 7,046,639 B2 | 5/2006 | Garcia-Luna-Aceves et al. |
| 7,046,654 B2 | 5/2006 | Chen |
| 7,046,690 B2 | 5/2006 | Sherman |
| 7,058,074 B2 | 6/2006 | Ho et al. |
| 7,065,144 B2 | 6/2006 | Walton et al. |
| 7,068,633 B1 | 6/2006 | Ho |
| 7,079,552 B2 | 7/2006 | Cain et al. |
| 7,082,117 B2 | 7/2006 | Billhartz |
| 7,085,281 B2 | 8/2006 | Thomas et al. |
| 7,092,737 B2 | 8/2006 | Horng et al. |
| 7,095,732 B1 | 8/2006 | Watson, Jr. |
| 7,099,300 B2 | 8/2006 | Sugaya |
| 7,099,671 B2 | 8/2006 | Liang |
| 7,116,652 B2 | 10/2006 | Lozano |
| 7,123,627 B2 | 10/2006 | Kowalski |
| 7,142,527 B2 | 11/2006 | Garcia-Luna-Aceves |
| 7,145,895 B2 | 12/2006 | Mueckenheim et al. |
| 7,149,245 B2 | 12/2006 | Budka et al. |
| 7,154,876 B2 | 12/2006 | Benveniste |
| 7,158,504 B2 | 1/2007 | Kadaba et al. |
| 7,158,803 B1 | 1/2007 | Elliott |
| 7,187,691 B2 | 3/2007 | Gavette |
| 7,206,083 B2 | 4/2007 | Shimada |
| 7,236,459 B1 | 6/2007 | Okholm et al. |
| 7,260,073 B2 | 8/2007 | Sipola |
| 7,263,083 B2 | 8/2007 | Kisigami et al. |
| 7,266,087 B2 | 9/2007 | Wahl |
| 7,269,152 B2 | 9/2007 | Vukovic et al. |
| 7,274,707 B2 | 9/2007 | Choi et al. |
| 7,277,149 B2 | 10/2007 | Kim et al. |
| 7,277,419 B2 | 10/2007 | McGowan |
| 7,277,430 B2 | 10/2007 | Ono et al. |
| 7,280,513 B2 | 10/2007 | Cao et al. |
| 7,284,260 B2 | 10/2007 | Hilts et al. |
| 7,301,924 B1 | 11/2007 | Gurbuz et al. |
| 7,301,944 B1 | 11/2007 | Redmond |
| 7,313,104 B1 | 12/2007 | Kern et al. |
| 7,330,877 B2 | 2/2008 | Kandala |
| 7,333,556 B2 | 2/2008 | Maltsev et al. |
| 7,336,642 B2 | 2/2008 | Rich et al. |
| 7,342,940 B2 | 3/2008 | Park |
| 7,366,202 B2 | 4/2008 | Scherzer et al. |
| 7,372,855 B2 | 5/2008 | Kandala |
| 7,400,641 B2 | 7/2008 | Nitschke et al. |
| 7,417,974 B2 | 8/2008 | Hansen |
| 7,440,573 B2 | 10/2008 | Lor et al. |
| 7,450,550 B2 | 11/2008 | Jin |
| 7,512,070 B2 | 3/2009 | Stephens |
| 7,525,994 B2 | 4/2009 | Scholte |
| 7,564,814 B2 | 7/2009 | Abraham et al. |
| 7,570,656 B2 | 8/2009 | Raphaeli et al. |
| 7,599,340 B2 | 10/2009 | Chandra et al. |
| 7,633,946 B2 | 12/2009 | Pavon et al. |
| 7,639,657 B1 | 12/2009 | Ho et al. |
| 7,676,236 B2 | 3/2010 | Nanda et al. |
| 7,706,399 B2 | 4/2010 | Janczak |
| 7,724,721 B2 | 5/2010 | Lim et al. |
| 7,818,018 B2 | 10/2010 | Nanda et al. |
| 7,869,432 B1 | 1/2011 | Mollyn |
| 7,881,340 B2 | 2/2011 | Farrag et al. |
| 7,894,538 B2 | 2/2011 | Walton et al. |
| 2001/0024173 A1 | 9/2001 | Katz |
| 2001/0053141 A1 | 12/2001 | Periyalwar et al. |
| 2001/0053695 A1 | 12/2001 | Wallentin |
| 2002/0009999 A1 | 1/2002 | Lee et al. |
| 2002/0021698 A1 | 2/2002 | Lee et al. |
| 2002/0046257 A1 | 4/2002 | Killmer |
| 2002/0067736 A1 | 6/2002 | Garcia-Luna-Aceves et al. |
| 2002/0071413 A1 * | 6/2002 | Choi ............ 370/337 |
| 2002/0071449 A1 * | 6/2002 | Ho et al. ............ 370/447 |
| 2002/0093929 A1 | 7/2002 | Mangold et al. |
| 2002/0110101 A1 | 8/2002 | Gopalakrishnan et al. |
| 2002/0172186 A1 | 11/2002 | Larsson |
| 2002/0172217 A1 | 11/2002 | Kadaba et al. |
| 2002/0174219 A1 | 11/2002 | Mei et al. |
| 2002/0191703 A1 | 12/2002 | Ling et al. |
| 2003/0002605 A1 | 1/2003 | Lo et al. |
| 2003/0003880 A1 | 1/2003 | Ling et al. |
| 2003/0015611 A1 | 1/2003 | Teng |
| 2003/0016692 A1 | 1/2003 | Thomas et al. |
| 2003/0043732 A1 | 3/2003 | Walton et al. |
| 2003/0050084 A1 | 3/2003 | Damnjanovic et al. |
| 2003/0063563 A1 | 4/2003 | Kowalski |
| 2003/0072280 A1 | 4/2003 | McFarland et al. |
| 2003/0076797 A1 | 4/2003 | Lozano |
| 2003/0103525 A1 | 6/2003 | Wahl |
| 2003/0108117 A1 | 6/2003 | Ketchum et al. |
| 2003/0125040 A1 | 7/2003 | Walton et al. |
| 2003/0128684 A1 | 7/2003 | Hirsch et al. |
| 2003/0147385 A1 | 8/2003 | Montalvo et al. |

| | | | | | | |
|---|---|---|---|---|---|---|
| 2003/0162519 A1 | 8/2003 | Smith et al. | EP | 1317110 A1 | 6/2003 | |
| 2003/0169763 A1 | 9/2003 | Choi et al. | EP | 1463217 A1 | 9/2004 | |
| 2003/0174645 A1 | 9/2003 | Paratainen et al. | JP | 2000174820 A | 6/2000 | |
| 2003/0174680 A1 | 9/2003 | Kuan et al. | JP | 2001024573 A | 1/2001 | |
| 2003/0198312 A1 | 10/2003 | Budka et al. | JP | 2001160813 A | 6/2001 | |
| 2003/0202574 A1 | 10/2003 | Budka et al. | JP | 2001160843 A | 6/2001 | |
| 2003/0223365 A1 | 12/2003 | Kowalski | JP | 2001507907 T | 6/2001 | |
| 2003/0223418 A1 | 12/2003 | Desai et al. | JP | 2001217768 A | 8/2001 | |
| 2004/0022213 A1 | 2/2004 | Choi et al. | JP | 2001522211 | 11/2001 | |
| 2004/0042556 A1 | 3/2004 | Medvedev et al. | JP | 2003060655 A | 2/2003 | |
| 2004/0047319 A1 | 3/2004 | Elg | JP | 2003078565 | 3/2003 | |
| 2004/0082356 A1 | 4/2004 | Walton et al. | JP | 2003163669 A | 6/2003 | |
| 2004/0105386 A1 | 6/2004 | Sipola | JP | 2003249939 A | 9/2003 | |
| 2004/0109433 A1 | 6/2004 | Khan | JP | 2003258807 A | 9/2003 | |
| 2004/0120349 A1 | 6/2004 | Border et al. | JP | 2003528507 A | 9/2003 | |
| 2004/0125778 A1 | 7/2004 | Lin et al. | JP | 2003289309 A | 10/2003 | |
| 2004/0131019 A1 | 7/2004 | Kandala | JP | 2005020163 A | 1/2005 | |
| 2004/0141522 A1 | 7/2004 | Texerman et al. | JP | 2005505148 T | 2/2005 | |
| 2004/0151199 A1 | 8/2004 | Sykes et al. | JP | 2005057373 A | 3/2005 | |
| 2004/0156345 A1 | 8/2004 | Steer et al. | JP | 2005094156 A | 4/2005 | |
| 2004/0156367 A1 | 8/2004 | Albuquerque et al. | KR | 20030036847 | 5/2003 | |
| 2004/0163129 A1 | 8/2004 | Chapman et al. | KR | 20040076979 A | 9/2004 | |
| 2004/0204104 A1 | 10/2004 | Horng et al. | KR | 20060090258 A | 8/2006 | |
| 2004/0246934 A1 | 12/2004 | Kim | KR | 20060090259 A | 8/2006 | |
| 2004/0252664 A1 | 12/2004 | Cao et al. | TW | 550926 B | 9/2003 | |
| 2004/0258039 A1 | 12/2004 | Stephens | TW | 200304292 | 9/2003 | |
| 2004/0258091 A1 | 12/2004 | Meyer et al. | TW | 567731 B | 12/2003 | |
| 2004/0264504 A1 | 12/2004 | Jin | TW | 200401549 | 1/2004 | |
| 2004/0266451 A1 | 12/2004 | Stolyar et al. | WO | WO9625811 A1 | 8/1996 | |
| 2005/0036475 A1 | 2/2005 | Nishiyama et al. | WO | WO9905881 A1 | 2/1999 | |
| 2005/0047429 A1 | 3/2005 | Koo et al. | WO | WO9957931 A1 | 11/1999 | |
| 2005/0053003 A1* | 3/2005 | Cain et al. ............... 370/235 | WO | WO0052880 A2 | 9/2000 | |
| 2005/0053064 A1 | 3/2005 | Wang | WO | WO0056113 A1 | 9/2000 | |
| 2005/0058078 A1 | 3/2005 | Jung et al. | WO | WO0064111 A1 | 10/2000 | |
| 2005/0111462 A1 | 5/2005 | Walton et al. | WO | WO0119032 A1 | 3/2001 | |
| 2005/0135284 A1 | 6/2005 | Nanda et al. | WO | WO0128170 A2 | 4/2001 | |
| 2005/0135291 A1 | 6/2005 | Ketchum et al. | WO | WO0171928 A2 | 9/2001 | |
| 2005/0135295 A1 | 6/2005 | Walton et al. | WO | WO0172081 | 9/2001 | |
| 2005/0135318 A1 | 6/2005 | Walton et al. | WO | WO0176110 A2 | 10/2001 | |
| 2005/0135403 A1 | 6/2005 | Ketchum et al. | WO | WO0213440 A2 | 2/2002 | |
| 2005/0135416 A1 | 6/2005 | Ketchum et al. | WO | WO0228119 A2 | 4/2002 | |
| 2005/0152314 A1 | 7/2005 | Sun et al. | WO | WO0233582 | 4/2002 | |
| 2005/0152465 A1 | 7/2005 | Maltsev et al. | WO | WO0233852 A2 | 4/2002 | |
| 2005/0239407 A1 | 10/2005 | Foore et al. | WO | WO0235873 A2 | 5/2002 | |
| 2005/0270975 A1 | 12/2005 | Meylan et al. | WO | WO02061969 A1 | 8/2002 | |
| 2006/0052088 A1 | 3/2006 | Pavon et al. | WO | WO02065664 A2 | 8/2002 | |
| 2006/0099956 A1 | 5/2006 | Harada et al. | WO | WO02078211 A2 | 10/2002 | |
| 2006/0159123 A1* | 7/2006 | Fleury et al. ............... 370/468 | WO | WO02082751 A2 | 10/2002 | |
| 2006/0164969 A1 | 7/2006 | Malik et al. | WO | WO02093843 A1 | 11/2002 | |
| 2006/0165021 A1 | 7/2006 | Tian et al. | WO | WO02100064 A2 | 12/2002 | |
| 2006/0165036 A1 | 7/2006 | Chandra et al. | WO | WO03032526 A1 | 4/2003 | |
| 2006/0193294 A1 | 8/2006 | Jorswieck et al. | WO | WO03034619 A1 | 4/2003 | |
| 2006/0268886 A1 | 11/2006 | Sammour et al. | WO | WO03034642 A2 | 4/2003 | |
| 2006/0274844 A1 | 12/2006 | Walton et al. | WO | WO03039074 A1 | 5/2003 | |
| 2007/0037548 A1 | 2/2007 | Sammour et al. | WO | WO03050968 A2 | 6/2003 | |
| 2007/0058543 A1 | 3/2007 | Fenart et al. | WO | WO03107577 A2 | 12/2003 | |
| 2007/0058605 A1 | 3/2007 | Meylan et al. | WO | WO2004030287 A2 | 4/2004 | |
| 2007/0230338 A1 | 10/2007 | Shao et al. | WO | WO2004038985 A2 | 5/2004 | |
| 2008/0130660 A1 | 6/2008 | Ros-Giralt et al. | WO | WO2005039127 A1 | 4/2005 | |
| 2009/0097444 A1 | 4/2009 | Lohr et al. | WO | WO2005039133 A1 | 4/2005 | |
| 2009/0103558 A1 | 4/2009 | Zangi et al. | | | | |
| 2009/0116434 A1 | 5/2009 | Lohr et al. | | | | |
| 2009/0252145 A1 | 10/2009 | Meylan et al. | | | | |
| 2009/0290655 A1 | 11/2009 | Abraham et al. | | | | |
| 2009/0323646 A1 | 12/2009 | Ketchum et al. | | | | |
| 2010/0290423 A1 | 11/2010 | Hwang et al. | | | | |
| 2010/0309872 A1 | 12/2010 | Amini et al. | | | | |
| 2011/0223952 A1 | 9/2011 | Nanda et al. | | | | |

FOREIGN PATENT DOCUMENTS

| | | |
|---|---|---|
| CN | 1350733 | 5/2002 |
| EP | 0475682 A2 | 3/1992 |
| EP | 0782360 A2 | 7/1997 |
| EP | 0912016 A2 | 4/1999 |
| EP | 1052855 A2 | 11/2000 |
| EP | 1089500 A2 | 4/2001 |
| EP | 1182900 A1 | 2/2002 |
| EP | 1187406 A1 | 3/2002 |
| EP | 1261183 A1 | 11/2002 |

OTHER PUBLICATIONS

International Search Report and the Written Opinion of the International Searching Authority for PCT Application No. PCT/US2005/009790, Mail Date: Jun. 8, 2005.

"TIA/EIA/IS-856 Standard" CDMA2000 High Rate Packet Data Air Interface Specification, Nov. 2000, (the IS-856 standard).

3GPP2 TS 25.211: "Physical channels and mapping of transport channels onto physical channels (FDD)", Release 6, V.6.0.0, Dec. 2003.

3GPP2 TS 25.212: "Multiplexing and channel coding (FDD)", Release 5, V.510.0, Jun. 2005.

3GPP2 TS 25.213: "Spreading and modulation (FDD)", Release 5, V5.6.0, Jun. 2005.

3GPP2 TS 25.214: "Physical layer procedures (FDD)", Release 5, V5.11.0, Jun. 2005.

3GPP: "TIA/EIA/IS-95-B Mobile Station-Base Station Compatibility Standard for Dual-Mode Wideband Spread Spectrum Cellular System".
TR-45.5 "Physical Layer Standard for CDMA 2000 Spread Spectrum Systems", (the IS-2000 standard).
ETSI TS 125 211 v5.1.0; "Universal Mobile Telecommunications System (UMTS); Physical channels and mapping of transport channels onto physical channels (FDD)", 3GPP TS 25.211 version 5.1.0 Release 5 (Sep. 2004).
Mangold, et al. "IEEE 802.11e Wireless LAN for Quality of Service," Feb. 2002, pp. 1-8, XP002251598.
Mujtaba, "TGN Sync Proposal Technical Specification," IEEE Wireless LANS, IEEE 802.11-04/0899r5, May 2005, pp. 1-134.
Seung et al., "Multi-Stage Partial PIC Receivers for Multi-Rate DS-CDMA System with Multiple Modulation", IEEE 2003, pp. 591-594.
TIA/EIA-95-B Mobile Station-Base Station Compatibility Standard for Dual-Mode Wideband Spread Spectrum Cellular System (IS-95 Standard), Mar. 1999.
Won-Tae et al., "MMAC: An Efficient WMATM MAC for Multicast Communications", Global Telecommunications Conference—Globecom '99, IEEE, pp. 587-591.
International Search Report and Written Opinion—PCT/US05/009790, International Search Authority—European Patent Office, Jun. 8, 2005.
Partial European Search Report—EP10010614 Search Authority—Munich Patent Office, Feb. 1, 2011.
TGn Sync Complete Proposal, IEEE 802.11-04/888r13, IEEE mentor, Jul. 8, 2005.
Translation of Office Action in Japan application 2008-531288 corresponding to U.S. Appl. No. 11/312,187, citing IEEE_802_11_04_888r13_TGn_Sync_Complete_year_2005, JP2005505148, JP2000174820, JP2005020163 and WO2005039133 dated Jan. 25, 2011.
TIA/EIA/IS-856-A, "cdma2000 High Rate Packet Data Air Interface Specification", 2004.
3GPP TS 25.211 v5.0.0 (Mar. 2002) Technical Specification Group Radio Access Network: Physical Channels and Mapping of Transport Channels onto Physical Channels (FDD) (Release 5).
3GPP TS 25.212 v6.0.0 (Dec. 2003) Technical Specification Group Radio Access Network; Multiplexing and Channel Coding (FDD) (Release 6).
3GPP TS 25.213 v6.0.0 (Dec. 2003) Technical Specification Group Radio Access Network; Spreading and Modulation (FDD) (Release 6).
3GPP TS 25.214 v6.0.0 (Dec. 2003) Technical Specification Group Radio Access Network; Physical Layer Procedures (FDD) (Release 6).
3GPP2-C.S0002-C v1.0, "Physical Layer Standard for cdma2000 Spread Spectrum Systems", (TR 45.5), Release C, May 28, 2002.
ETSI TS 125 211 v5.6.0; "Universal Mobile Telecommunications System (UMTS); Physical channels and mapping of transport channels onto physical channels (FDD)", 3GPP TS 25.211 version 5.6.0 Release 5 (Sep. 2004).
ETSI TS 125 212 v6.2.0; "Universal Mobile Telecommunications System (UMTS); Multiplexing and channel coding (FDD)", 3G TS 25.212 version 6.2.0 Release 6 (Jun. 2004).
ETSI TS 125 213 v6.0.0; "Universal Mobile Telecommunications System (UMTS); Spreading and modulation (FDD)", 3G TS 25.213 version 6.0.0 Release 5 (Dec. 2003).
ETSI TS 125 214 v6.3.0; "Universal Mobile Telecommunications System (UMTS); Physical layer procedures (FDD)", 3G TS 25.214 version 6.3.0 Release 6 (Sep. 2004).
IEEE Std. 802.11a-1999 Part 11: Wireless LAN Medium Access Control (MAC) and Physical Layer (PHY) Specifications: High-speed Physical Layer in the 5 GHZ Band.
IEEE Std. 802.11b-1999 Part 11: Wireless LAN Medium Access Control (MAC) and Physical Layer (PHY) Specifications: Higher-Speed Physical Layer Extension in the 2.4 GHz Band.
IEEE Std. 802.11g-2003 Part 11: Wireless LAN Medium Access Control (MAC) and Physical Layer (PHY) Specifications, Amendment 4: Further Higher Data Rate Extension in the 2.4 GHz Band.
3GPP: "TIA/EIA/IS-95-B Mobile Station-Base Station Compatibility Standard for Dual Mode Wideband Spread Spectrum Cellular System". Feb. 3, 1999.
Ohgane et al. "Eigenbeam Spatial Multiplex (E-SDM) System in MIMO Channels", Technical Research Report by Electric Information Communication Academic Conference, May 17, 2002, vol. 102, No. 86, pp. 13-18, RCS2002-53.
TR-45.5 Physical Layer Standard for cdma2000 Spread Spectrum Systems, 3GPP2 C.S000-2D, Version 1.0, Feb. 13, 2004.
3GPP TS 25.211 Physical channels and mapping of transport channels onto physical channels (FDD). Release 5, V5.0.0, Mar. 2002.
ETSI TS 125 213 v6.0.0; "Universal Mobile Telecommunications System (UMTS); Spreading and modulation (FDD)", 3G TS 25.213 version 6.0.0 Release 6 (Dec. 2003).
"MIMO-related Technology," Collection of Standard Technologies of the Japan Patent Office, May 25, 2005, 1-1-1, 1-1-3, URL: http://www.jpo.go.jp/shiryou/s_sonota/hyoujun_gijutsu/mimo/mokuji.htm.
Edfors et al, "OFDM Channel Estimation by Singular Value Decomposition," IEEE Transactions on Communications, 46(7):931-939, (Jul. 1998).
Fu J., et al., "The Largest Eigenvalue Characteristics for MIMO Channel with Spatial Correlation in Multipath Fading", Technical Report of the Institute of Electronics, Information and Communication Engineers, Feb. 27, 2003, vol. 102, No. 681, pp. 171-178, RCS 2002-334.
Ivrlac M. T., et al., "Efficient Use of Fading Correlations in MIMO Systems", Vehicular Technology Conference, 2001, VTC 2001 Fall, vol. 4, pp. 2763-2767.
Sheu, Shiann-Tsong et al.: "An Improved Data Flushing MAC Protocol for IEEE 802.11 Wireless Ad Hoc Network," VTC 2002-Fall. 2002 IEEE 56th Vehicular Technology Conference Proceedings. Vancouver, Canada, Sep. 24-28, 2002; [IEEE Vehicular Technolgy Conference], New York, NY: IEEE, US, vol. 4, (Sep. 24, 2002), pp. 2435-2439; XP010608871; ISBN: 978-0-7803-7467-6 the whole document.
Taiwan Search Report—TW094109360—TIPO—Sep. 23, 2011.
European Search Report—EP10011027—Search Authority—Munich—Apr. 20, 2012 (030278EPD1).
Taiwan Search Report—TW094118180—TIPO—Mar. 14, 2012.

* cited by examiner

METHOD AND APPARATUS FOR AN AD-HOC WIRELESS COMMUNICATIONS SYSTEM

CLAIM OF PRIORITY UNDER 35 U.S.C. §119

The present Application for Patent claims priority to:

Provisional Application No. 60/556,965 entitled "Method and Apparatus for Scheduling in an Ad Hoc Network" filed Mar. 26, 2004;

Provisional Application No. 60/576,545 entitled "Method and Apparatus for Robust Wireless Network," filed Jun. 2, 2004;

Provisional Application No. 60/586,841 entitled "Method and Apparatus for Distributing Communication Resources Among Multiple Users," filed Jul. 8, 2004; and Provisional Application No. 60/600,960 entitled "Method, Apparatus, and System for Wireless Communications," filed Aug. 11, 2004, all assigned to the assignee hereof and hereby expressly incorporated by reference herein.

REFERENCE TO CO-PENDING APPLICATIONS FOR PATENT

The present Application for Patent is related to the following co-pending U.S. Patent Applications:

"High Speed Media Access Control with Legacy System Interoperability," having U.S. application Ser. No. 10/964,330, filed Oct. 13, 2004, assigned to the assignee hereof, and expressly incorporated by reference herein.

BACKGROUND

1. Field

The present invention relates generally to communications, and more specifically to medium access control.

2. Background

Wireless communication systems are widely deployed to provide various types of communication such as voice and data. A typical wireless data system, or network, provides multiple users access to one or more shared resources. A system may use a variety of multiple access techniques such as Frequency Division Multiplexing (FDM), Time Division Multiplexing (TDM), Code Division Multiplexing (CDM), and others.

Example wireless networks include cellular-based data systems. The following are several such examples: (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in "TR-45.5 Physical Layer Standard for cdma2000 Spread Spectrum Systems" (the IS-2000 standard), and (4) the high data rate (HDR) system that conforms to the TIA/EIA/IS-856 standard (the IS-856 standard).

Other examples of wireless systems include Wireless Local Area Networks (WLANs) such as the IEEE 802.11 standards (i.e. 802.11 (a), (b), or (g)). Improvements over these networks may be achieved in deploying a Multiple Input Multiple Output (MIMO) WLAN comprising Orthogonal Frequency Division Multiplexing (OFDM) modulation techniques. IEEE 802.11(e) has been introduced to improve upon some of the shortcomings of previous 802.11 standards.

As wireless system designs have advanced, higher data rates have become available. Higher data rates have opened up the possibility of advanced applications, among which are voice, video, fast data transfer, and various other applications. However, various applications may have differing requirements for their respective data transfer. Many types of data may have latency and throughput requirements, or need some Quality of Service (QoS) guarantee. Without resource management, the capacity of a system may be reduced, and the system may not operate efficiently.

An ad hoc network of 802.11 wireless LAN stations (STA) with no centralized controller is known as an Independent Basic Service Set (IBSS). In the prior art, Quality of Service (QoS) facilities have not been available in an IBSS. Medium Access Control (MAC) protocols are commonly used to allocate a shared communication resource between a number of users. MAC protocols commonly interface higher layers to the physical layer used to transmit and receive data. To benefit from an increase in data rates, a MAC protocol must be designed to utilize the shared resource efficiently. It is also generally desirable to maintain interoperability with alternate or legacy communication standards. There is therefore a need in the art for an IBSS that permits low-latency, reduced contention, distributed scheduling useful in any ad hoc network, but particularly suitable for high throughput systems. There is a further need in the art for such processing that is backward compatible with various types of legacy systems.

SUMMARY

According to one aspect, an apparatus is described which includes a memory for storing a sequence list, a receiver for receiving a first signal indicating transfer of control of a shared medium from a first remote station with an associated station identifier in the sequence list, and a transmitter for transmitting on the shared medium subsequent to receiving the signal, and for transmitting a second signal indicating transfer of control of the shared medium to a second remote station with an associated station identifier in the sequence list subsequent to expiration of a time allotment for control of the shared medium.

According to another aspect, a message is disclosed, operable for indicating transfer of control of a shared medium, comprising a first station identifier associated with a first station transferring control, and a second station identifier associated with a second station receiving control, the second station identifier subsequent to the first station identifier in a sequence list.

According to another aspect, a message is disclosed, operable for indicating transfer of control of a shared medium, comprising a station identifier associated with the station receiving control, and a sequence list comprising station identifiers associated with a plurality of stations for sequentially accessing a shared medium.

According to another aspect, a method for sharing a common medium is provided for forming a sequence list comprising one or more station identifiers, and transmitting a token from a first station to a second station, in accordance with the sequence list, to pass control of the common medium from the first station to the second station.

According to another aspect, a method is provided for transmitting a token from a first station with access to a shared medium to a second station according to a list of one or more stations sharing the shared medium in sequence, and transferring control of the shared access to the second station after the token is transmitted.

According to another aspect, a BSS is described which includes a plurality of stations sharing access to a common medium, and token-passing means for sequential service of flows from one or more of the plurality of stations according to a list comprising identifiers corresponding to the one or more of the plurality of stations.

According to another aspect, a method, operable in a wireless network, comprising one or more stations sharing a common medium, is provided for accessing the medium in a series of time segments, the segments delineated by a first signal, transmitting a second signal on the shared medium from a first station after a first delay following the transmission of the first signal, the first delay less than one or more second delays employed by one or more remote stations, the second signal comprising a token message for transferring control of the shared medium to a second station.

According to another aspect, an apparatus is described which includes means for forming a sequence list comprising one or more station identifiers, and means for transmitting a token from a first station to a second station, in accordance with the sequence list, to pass control of a common medium from the first station to the second station.

According to another aspect, an apparatus is described which includes means for transmitting a token from a first station with access to a shared medium to a second station according to a list of one or more stations sharing the shared medium in sequence, and means for transferring control of the shared access to the second station after the token is transmitted.

According to another aspect, computer readable media is disclosed operable to perform forming a sequence list comprising one or more station identifiers, and transmitting a token from a first station to a second station, in accordance with the sequence list, to pass control of a common medium from the first station to the second station.

Various other aspects and embodiments are also disclosed.

DETAILED DESCRIPTION

Figure 1:
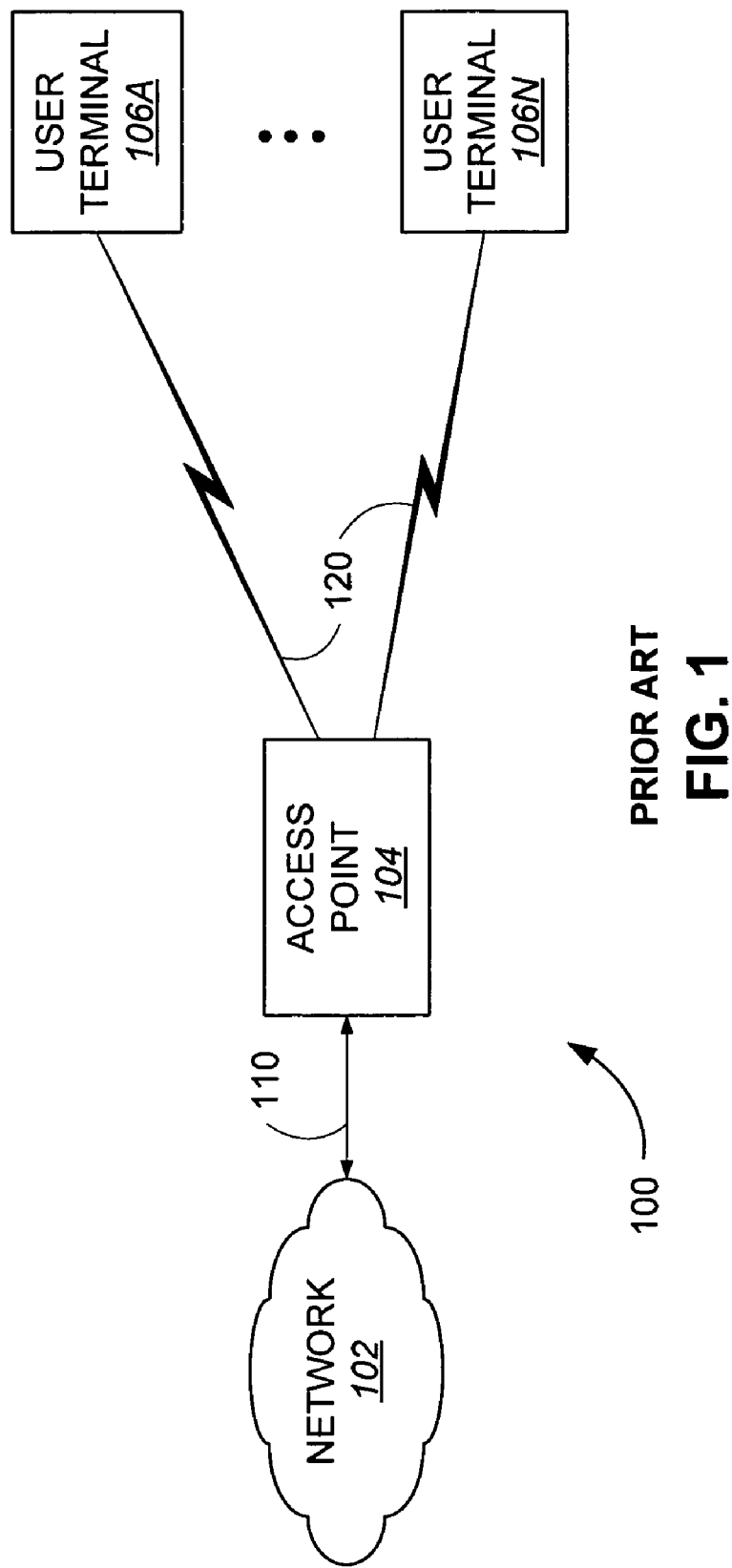
FIG. 1 is an example embodiment of a prior art Basic Service Set (BSS)

An ad hoc network of 802.11 wireless LAN stations (STA) with no centralized controller is known as an Independent Basic Service Set (IBSS). Until now, Quality of Service (QoS) facilities have not been available in an IBSS. An IBSS that allows token passing for round-robin (RR) service of QoS flows is referred to herein as an RRBSS. The RRBSS is an enhancement of the IBSS that permits low-latency, reduced contention, distributed scheduling useful in any ad hoc network, but particularly suitable for high data rates. Distributed low-latency scheduled access is provided for QoS flows through a round-robin (RR) token passing service discipline. RR STAs follow a round-robin order and are able to communicate with round-robin transmit opportunities (RR TXOPs) during a portion of the beacon interval known as the RR period or RRP. In one embodiment, only STAs with QoS flows are permitted to join the RR schedule and access the medium during the RRP. Best effort flows continue to access the medium using Distributed Coordination Function (DCF) in the Contention Period (CP), detailed further below.

Example embodiments are disclosed herein that support highly efficient operation in conjunction with very high bit rate physical layers for a wireless LAN (or similar applications that use newly emerging transmission technologies). The example WLAN supports bit rates in excess of 100 Mbps (million bits per second) in bandwidths of 20 MHz. As the wireless LAN bandwidth increases, the mean packet delays are automatically reduced. Introduction of round robin scheduling further provides reduction in delay jitter and thus enables serving of QoS flows in an ad hoc network.

Various example embodiments preserve the simplicity and robustness of the distributed coordination operation of legacy WLAN systems, examples of which are found in 802.11 standards such as (a), (b), and (e). The advantages of the various embodiments may be achieved while maintaining backward compatibility with such legacy systems. (Note that, in the description below, 802.11 systems are described as example legacy systems. Those of skill in the art will recognize that the improvements are also compatible with alternate systems and standards.)

An example WLAN may support high data rate, high bandwidth physical layer transport mechanisms in general, including, but not limited to, those based on OFDM modulation, single carrier modulation techniques, systems using multiple transmit and multiple receive antennas (Multiple Input Multiple Output (MIMO) systems, including Multiple Input Single Output (MISO) systems) for very high bandwidth efficiency operation, systems using multiple transmit and receive antennas in conjunction with spatial multiplexing techniques to transmit data to or from multiple user terminals during the same time interval, and systems using code division multiple access (CDMA) techniques to allow transmissions for multiple users simultaneously. Alternate examples include Single Input Multiple Output (SIMO) and Single Input Single Output (SISO) systems.

One or more exemplary embodiments described herein are set forth in the context of a wireless data communication system. While use within this context is advantageous, different embodiments of the invention may be incorporated in different environments or configurations. In general, the various systems described herein may be formed using software-controlled processors, integrated circuits, or discrete logic. The data, instructions, commands, information, signals, symbols, and chips that may be referenced throughout the application are advantageously represented by voltages, currents, electromagnetic waves, magnetic fields or particles, optical fields or particles, or a combination thereof. In addition, the blocks shown in each block diagram may represent hardware or method steps. Method steps can be interchanged without departing from the scope of the present invention. The word "exemplary" is used herein to mean "serving as an example, instance, or illustration." Any embodiment described herein as "exemplary" is not necessarily to be construed as preferred or advantageous over other embodiments.

FIG. 1 is an example embodiment of a prior art system 100, comprising a centralized Access Point (AP) 104 connected to one or more User Terminals (UTs) 106A-N, commonly referred to as a Basic Service Set (BSS). In accordance with 802.11 terminology, in this document the AP and the UTs are also referred to as stations or STAs. The AP and the UTs communicate via Wireless Local Area Network (WLAN) 120. In the example embodiment, WLAN 120 is a high speed MIMO OFDM system. However, WLAN 120 may be any wireless LAN. Access point 104 communicates with any number of external devices or processes via network 102. Network 102 may be the Internet, an intranet, or any other wired, wireless, or optical network. Connection 110 carries the physical layer signals from the network to the access point 104. Devices or processes may be connected to network 102 or as UTs (or via connections therewith) on WLAN 120. Examples of devices that may be connected to either network 102 or WLAN 120 include phones, Personal Digital Assistants (PDAs), computers of various types (laptops, personal computers, workstations, terminals of any type), video devices such as cameras, camcorders, webcams, and virtually any other type of data device. Processes may include voice, video, data communications, etc. Various data streams may have varying transmission requirements, which may be accommodated by using varying Quality of Service (QoS) techniques.

Figure 2:
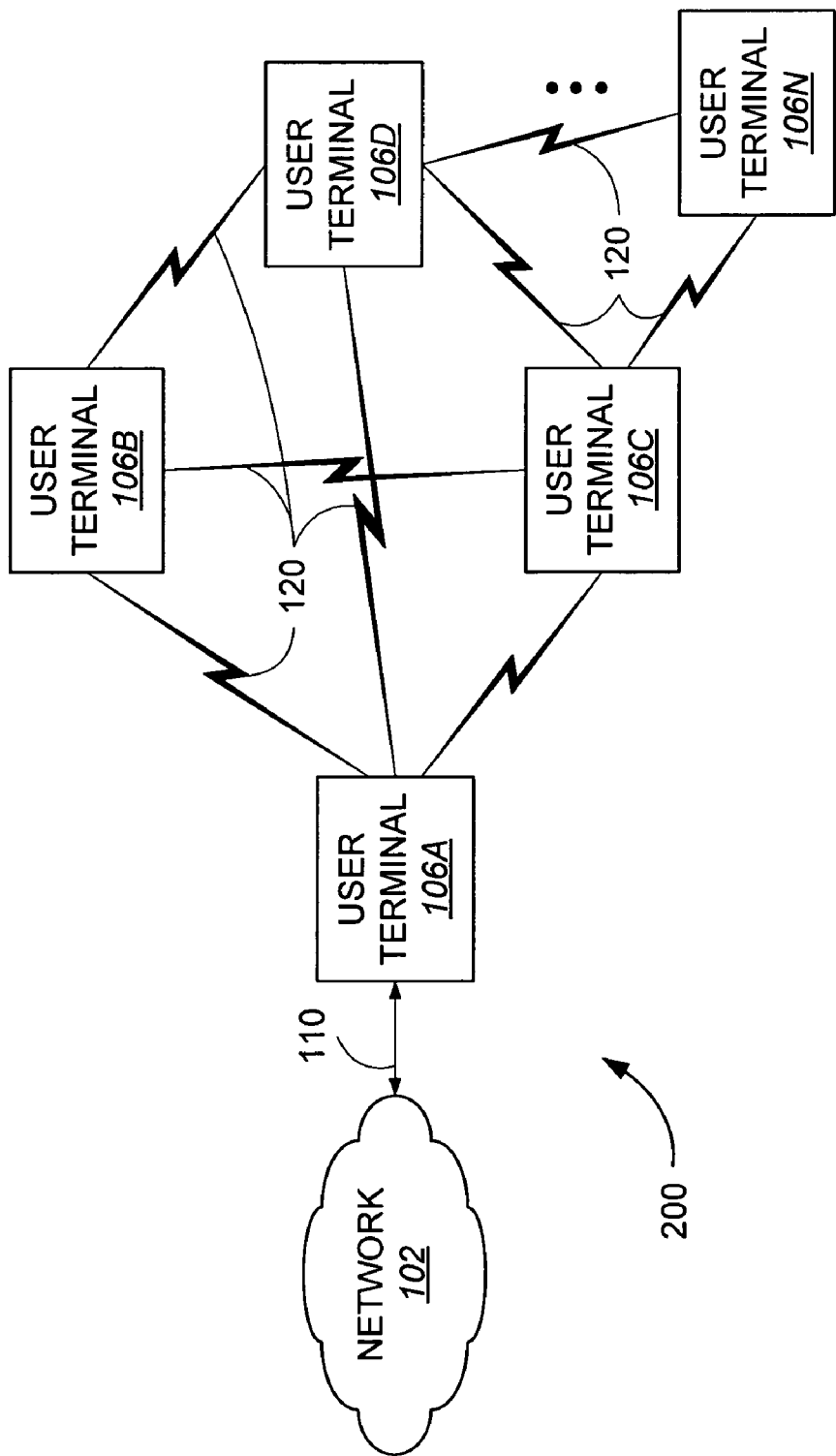
FIG. 2 depicts an example embodiment of an IBSS, operable as a RRBSS.

FIG. 2 depicts an IBSS system 200, comprising UTs or STAs 106 communicating on WLAN 120. Note that not every STA may be able to communicate with every other STA in system 200. User terminal 106A is shown connected to an external network 102 via connection 110 (which may be any type of connection, wired or wireless, using any protocol). This is optional, as the IBSS need not include any other connections in addition to WLAN 120. An IBSS deployed with one or more of the round robin features, example embodiments of which are detailed below, is referred to as an RRBSS. Note that an RRBSS may comprise any type of STA, including access points, which may function as a UT, or may interoperate with the RR techniques described below. As such, wireless communication devices will generally be referred to as STAs in the description below, and a STA may be any type of device described herein.

Figure 3:
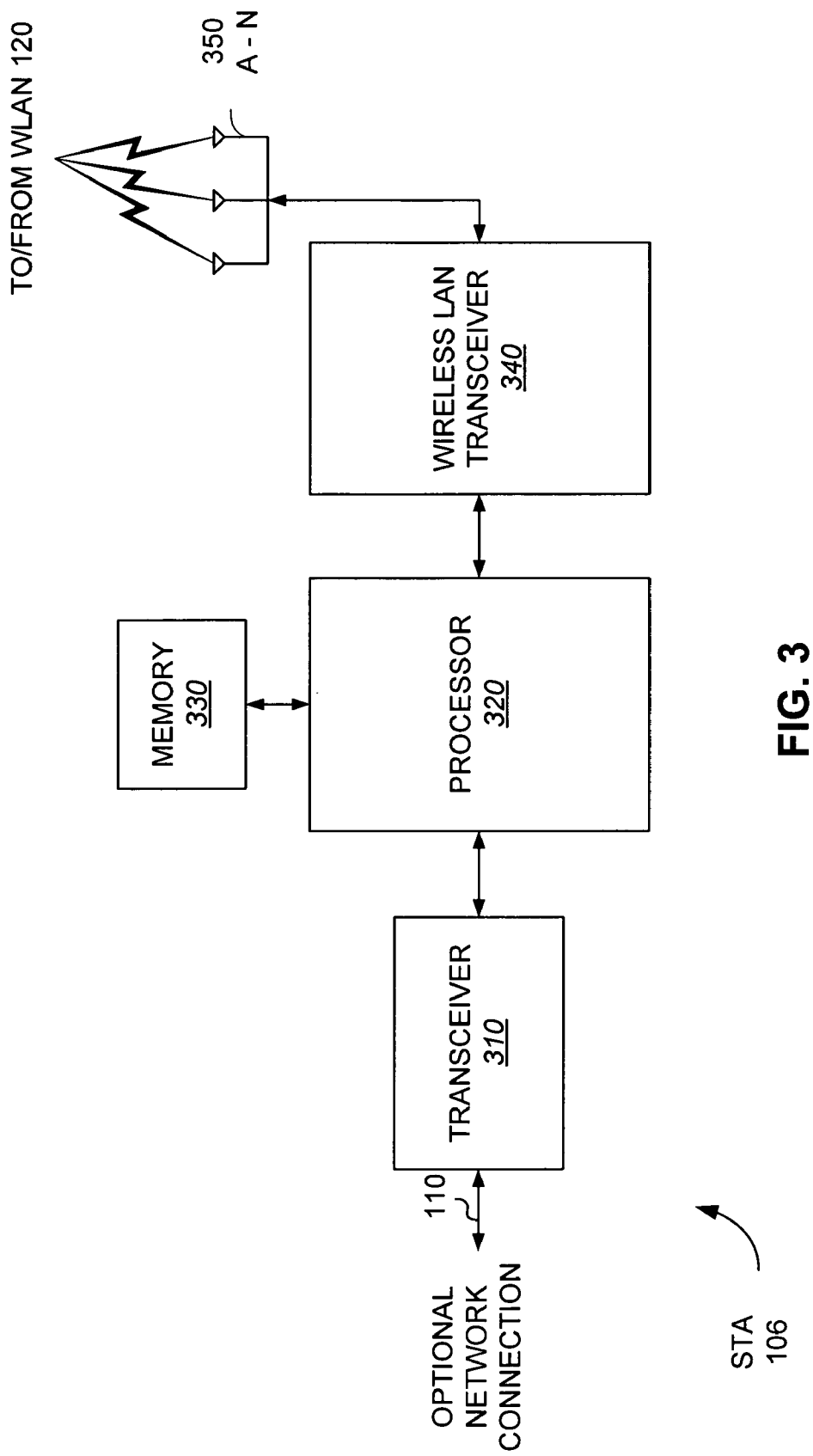
FIG. 3 depicts an example embodiment of a wireless communication device, or STA.

FIG. 3 depicts an example embodiment of a wireless communication device, or STA 106. Transceiver 310 is optional, and may be deployed to receive and transmit on connection 110 according to the physical layer requirements of network 102. Wireless LAN transceiver 340, detailed further below, transmits and receives data on WLAN 120 via one or more antennas 350.

Data from or to devices or applications connected to WLAN 120 or network 102 may be processed with processor 320. These data may be referred to herein as flows. Flows may have different characteristics and may require different processing based on the type of application associated with the flow. For example, video or voice may be characterized as low-latency flows (video generally having higher throughput requirements than voice). Many data applications are less sensitive to latency, but may have higher data integrity requirements (i.e., voice may be tolerant of some packet loss, file transfer is generally intolerant of packet loss). QoS for flows may be managed using round-robin technique disclosed herein.

Processor 320 receives data, signals, messages, etc. from WLAN transceiver 340 (or transceiver 310). Received data may be processed for transmission on another link, such as a mesh link, or other WLAN or wired connection. Media Access Control (MAC) processing may be performed in processor 320. Control and signaling may also communicated between STASs, as detailed further below. MAC Protocol Data Units (MAC PDUs), or frames (in 802.11 parlance), may be encapsulated in Physical layer (PHY) Protocol Data Units (PPDUs), and may be delivered to and received from wireless LAN transceiver 340.

In an example embodiment, the Adaptation layer (ADAP) and Data Link Control layer (DLC) are performed in processor 320. The physical layer (PHY) is performed on wireless LAN transceiver 340, in conjunction with processor 320. Those of skill in the art will recognize that segmentation of the various functions may be made in any of a variety of configurations. Processor 320 may perform some or all of the processing for the physical layer. A wireless LAN transceiver may include a processor for performing MAC processing, or subparts thereof. Any number of processors, special purpose hardware, or combination thereof may be deployed. Layers described herein are illustrative only.

Processor 320 may be a general-purpose microprocessor, a digital signal processor (DSP), or a special-purpose processor. Processor 320 may be connected with special-purpose hardware to assist in various tasks (details not shown). Various applications may be run on externally connected processors, such as an externally connected computer (or over a network connection), may run on an additional processor within wireless communication device 106 (not shown), or may run on processor 320 itself. Processor 320 is shown connected with memory 330, which may be used for storing data as well as instructions for performing the various procedures and methods described herein. Those of skill in the art will recognize that memory 330 may be comprised of one or more memory components of various types, that may be embedded in whole or in part within processor 320.

Wireless LAN transceiver 340 may be any type of transceiver (including any type of receiver and/or transmitter). In an example embodiment, wireless LAN transceiver 340 is an OFDM transceiver, which may be operated with a MIMO or MISO interface. OFDM, MIMO, and MISO are known to those of skill in the art. Various example OFDM, MIMO and MISO transceivers are detailed in co-pending U.S. patent application Ser. No. 10/650,295, entitled "FREQUENCY-INDEPENDENT SPATIAL-PROCESSING FOR WIDE- BAND MISO AND MIMO SYSTEMS", filed Aug. 27, 2003, assigned to the assignee of the present invention. Alternate embodiments may include SIMO or SISO systems. An example receiver may comprise RF conversion components (such as filters, amplifiers, mixers, oscillators, phase-locked loops, analog-digital converters, etc.), demodulators, RAKE receivers, equalizers, decoders, deinterleavers, combiners, and other components well known in the art. Signals received at transceiver 340 may be demodulated according to one or more communication designs or standards. In an example embodiment, a demodulator capable of demodulating MIMO OFDM signals is deployed. In alternate embodiments, alternate standards may be supported, and embodiments may support multiple communication formats.

Transmitted signals are formatted in transceiver 340 according to one or more wireless system standards or designs, such as those listed above. Examples of components that may be included in transceiver 340 are amplifiers, filters, digital-to-analog (D/A) converters, radio frequency (RF) converters, and the like. Data and control channels may be formatted for transmission in accordance with a variety of formats. Data for transmission on the forward link data channel may be formatted in a modulator (not shown) according to a rate and modulation format indicated by a scheduling algorithm. Examples of other components that may be incorporated in a transmitter of a transceiver 340 include encoders, interleavers, spreaders, and modulators of various types.

Wireless LAN transceiver 340 is shown connected with antennas 350 A-N. Any number of antennas may be supported in various embodiments. Antennas 350 may be used to transmit and receive on various WLANs (i.e. 120).

Wireless LAN transceiver 340 may comprise a spatial processor connected to each of the one or more antennas 350. The spatial processor may process the data for transmission independently for each antenna or jointly process the received signals on all antennas. Examples of the independent processing may be based on channel estimates, feedback from a remote station, such as a UT or other STA, channel inversion, or a variety of other techniques known in the art. The processing is performed using any of a variety of spatial processing techniques. Various transceivers of this type may use beam forming, beam steering, eigen-steering, or other spatial techniques to increase throughput to and from a given user terminal. In an example embodiment, in which OFDM symbols are transmitted, the spatial processor may comprise sub-spatial processors for processing each of the OFDM subchannels, or bins.

In an example system, a first STA may have N antennas, and a second STA may have M antennas. There are thus M×N paths between the antennas of the first STA and second STA. A variety of spatial techniques for improving throughput using these multiple paths are known in the art. In a Space Time Transmit Diversity (STTD) system (also referred to herein as "diversity"), transmission data is formatted and encoded and sent across all the antennas as a single stream of data. With M transmit antennas and N receive antennas there may be MIN (M, N) independent channels that may be formed. Spatial multiplexing exploits these independent paths and may transmit different data on each of the independent paths, to increase the transmission rate.

Various techniques are known for learning or adapting to the characteristics of the channel between the two STAs. Unique pilots may be transmitted from each transmit antenna. The pilots are received at each receive antenna and measured. Channel state information feedback may then be returned to the transmitting device for use in transmission. Eigen decomposition of the measured channel matrix may be performed to determine the channel eigenmodes. An alternate technique, to avoid eigen decomposition of the channel matrix at the receiver, is to use eigen-steering of the pilot and data to simplify spatial processing at the receiver.

Thus, depending on the current channel conditions, varying data rates may be available for transmission to various user terminals or other STAs throughout the system. The wireless LAN transceiver 340 may determine the supportable rate based on whichever spatial processing is being used for the physical link.

The number of antennas may be deployed depending on the STA data needs as well as size and form factor. For example, a high definition video display may comprise, for example, four antennas, due to its high bandwidth requirements, while a PDA may be satisfied with two.

Figure 4:
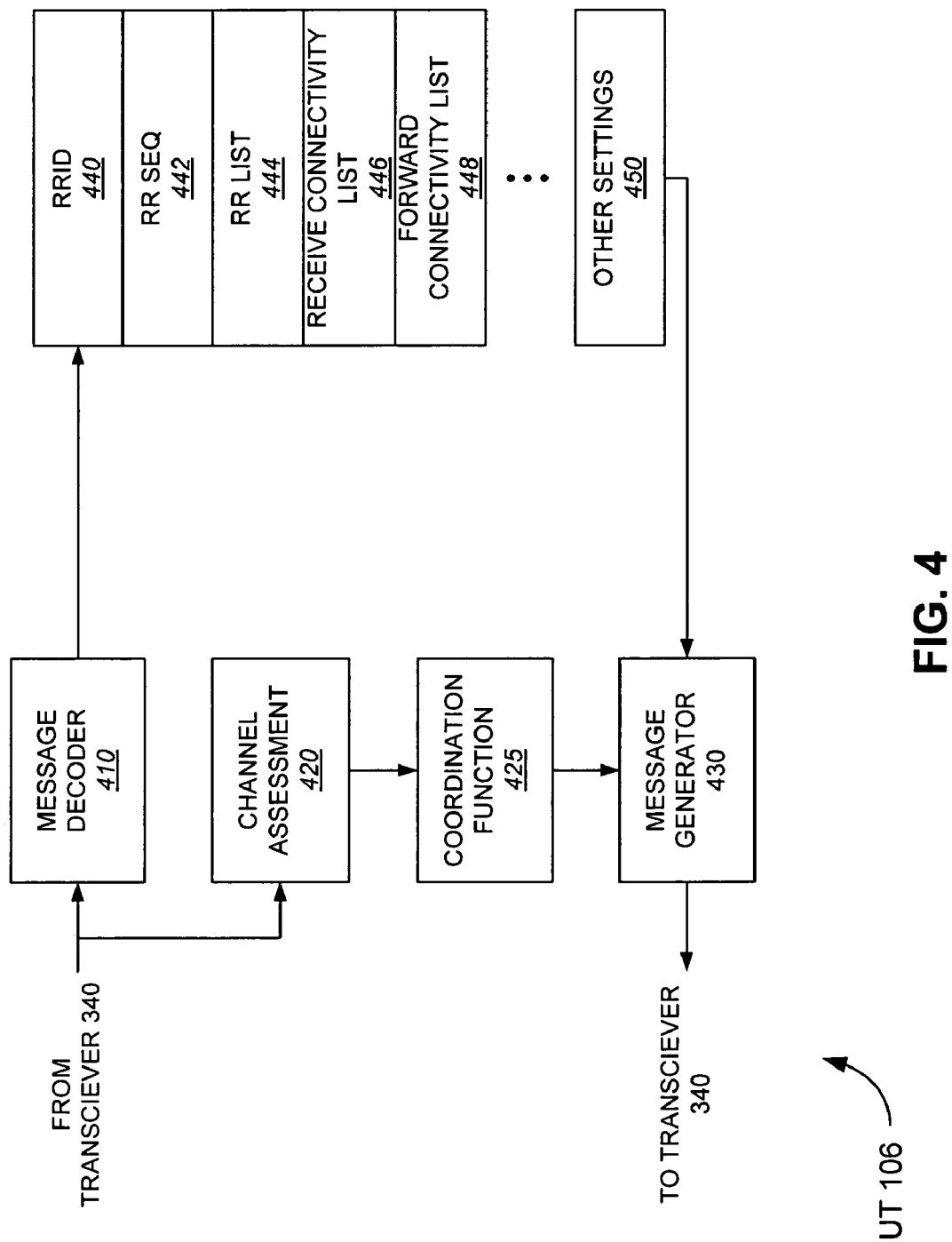
FIG. 4 illustrates a portion of an example embodiment of a STA.

FIG. 4 illustrates a portion of an example embodiment of a STA 106. The various functional blocks shown are illustrative only and may be deployed, as described above, as discrete logic, functions or processes of a processor (i.e. processor 320), in association with storage, such as memory 330, or any combination thereof. In this example, signals are received from a transceiver, such as transceiver 340 (or 310).

Channel assessment block 420 may be deployed to determine whether the shared medium (such as WLAN 120) is being utilized by another STA, or to detect that the medium is idle, using any of a variety of means (for example, a threshold on received energy). Clear Channel Assessment (CCA) techniques are well known in the art. Channel assessment block 420 may also perform beacon detection to establish a system time period. In an example embodiment, the RRP is chosen to be a fraction of the Target Beacon Transmission Time (TBTT) interval. Channel assessment and beacon detection techniques are well known in the art. For example, any device for detecting a beacon signal (i.e., measuring received signal strength, searching, decoding, deinterleaving, filtering, or any other signal processing techniques, well known in the art) may be deployed. Channel assessment 420 is shown connected to coordination function 425. In an example embodiment, it is convenient to use CSMA/CA and the ad hoc networking concepts from the 802.11 Distributed Coordination Function (DCF), or extensions thereof or additions thereto, for initial access and discovery of other STAs. Techniques disclosed herein interoperate with such 802.11 systems, as well as ad hoc systems of any other types. Coordination function 425 may perform DCF or other access procedures, as well as the round robin coordination detailed with respect to the various embodiments herein. Coordination function 425 is shown connected to message generator 430, which may deliver messages for transmission in response to decoded signals and messages as well as determinations of channel conditions, and in response to functions and procedures of coordination function logic 425.

Message decoder 410 is used to decode messages received from a remote station, such as a STA. Various example messages and signals, and parameters included therein, are illustrated further below. A message decoder may be deployed using any combination of discrete logic or processing functions, as described above. A message decoder may receive a signal from a receiver or transceiver, and that signal may have been processed using any number of signal processing techniques, such as RF downconversion, amplification, filtering, analog-to-digital conversion, error correction, decoding, deinterleaving, and the like. The message decoder may also include one or more of those functions. The message decoder, examples of which are well known in the art, may be used to extract various fields of information from messages carried on one or more channels (which channels may be of differing formats). The data extracted from the fields may be made available for further processing (by a processor, as described, or by other logic).

Message generator 430 generates messages for transmission, such as on transceiver 340 or 310. A message generator 430 may be deployed using any combination of discrete logic or processing functions, as described above. The message formed may be included, with or without other messages, in one or more channels for transmission according to any transmission scheme, examples of which are detailed above, and of which numerous examples are well known in the art. The message may be an aggregation of various fields of data, examples of which are detailed below. In the example embodiment, message generator 430 may form, among other messages, MAC PDUs (described above). (Note that message decoder 410 may be deployed operable to decode MAC PDUs, as well as other messages.) Those of skill in the art will readily adapt the principles disclosed herein to any type of data or control messages or signals.

Various other messages are known in the art, and may be used within the scope of the present invention. For example, messages for requesting and admitting or denying association with a STA may be deployed. Acknowledgement (ACK or NAK) messages may be included in various communication formats. Procedures and messages for establishing or tearing down flows between one or more STAs may be deployed.

Illustrative round robin parameters are shown in FIG. 4. These may be extracted from received messages from remote stations, and may be generated or modified in processor 320, and may be stored in memory 330, may be included in one or more messages of various types (i.e. generated in message generator 430). Examples, detailed further below, include the following: a Round Robin Identifier (RRID) 440 for identifying the STA to others in the round robin network, a Round Robin Sequence number (RR Seq) 442 for identifying a round robin sequence and indicating changes thereto, a Round Robin List (RR List) 444 comprising the RRIDs and their respective order in the round robin sequence, a receive connectivity list for indicating which RRIDs in the RR List are receivable at the STA, a forward connectivity list 448 for maintaining RRIDs in the RR List associated with STAs capable of receiving from the STA, and various other settings 450. These parameters may be used for various procedures described below, and may be transmitted to other STAs for coordination of the round robin sequence.

Figure 5:
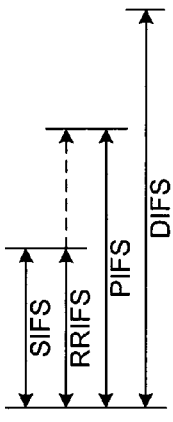
FIG. 5 depicts an example relationship between the delay parameters used to establish and maintain the RRP.

FIG. 5 depicts an example relationship between the delay parameters used to establish and maintain the RRP. In this example, Interframe Spacings (IFS) from the 802.11 DCF may be used. Interframe spacing time durations vary depending on the type of gap inserted between transmissions on the shared medium by two or more STAs. A time delay relationship between the Short Interframe Spacing (SIFS), the Point Interframe Spacing (PIFS), and the DCF Interframe Spacing (DIFS) and the Round Robin Interframe Spacing (RRIFS) is indicated. Note that SIFS<PIFS<DIFS. Thus, a transmission following a shorter time duration will have a higher priority than one which must wait longer before attempting to access the channel. In a DCF BSS, where an AP acts as a centralized controller, the PIFS duration is defined to give the AP priority access to the medium. RRIFS may be set less than PEFS when ad hoc round robin transmission is desired within a system also incorporating an access point (which adheres to a PIFS backoff restriction), thus giving the round robin transmissions priority over those from the access point. In an alternate embodiment, RRIFS may also be set larger than PIFS, to give AP coordinated traffic priority over round-robin traffic. In another embodiment, RRIFS may be equal to PIFS. While not mandatory, in the example embodiment, RRIFS is set larger than SIFS to allow priority for messages such as ACK, NAK, and others adhering to SIFS backoff restrictions. In alternate embodiments, other priority mechanisms may be used. Those of skill in the art will readily adapt the principles disclosed herein to deploy round robin procedures in any of a variety of ad hoc systems using any of a variety of priority mechanisms. In general, any delay parameter may be deployed for allowing the RR transmission to seize and utilize the channel to provide the desired QoS features. Techniques for managing the round robin use of the shared medium and fairness are illustrated further below.

Figure 6:
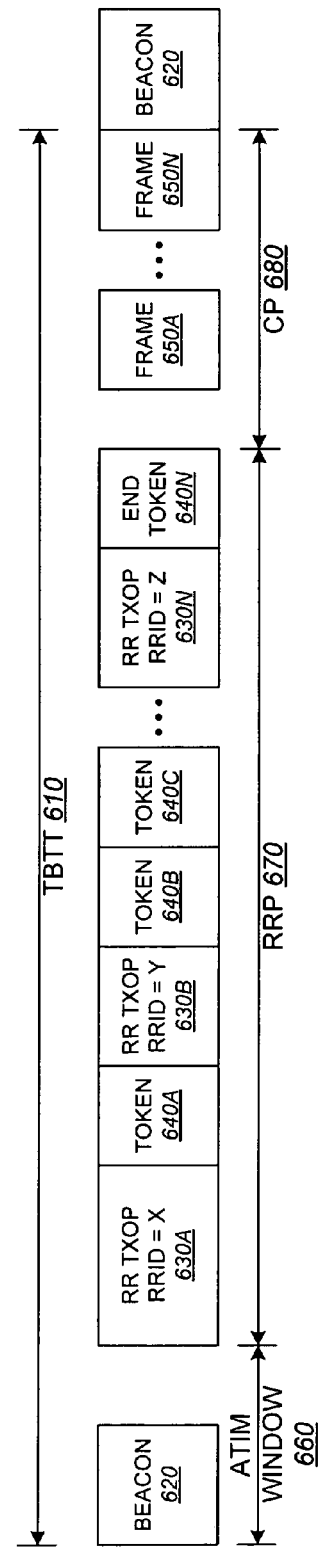
FIG. 6 illustrates an example timeline of an RRBSS in operation.

FIG. 6 illustrates an example timeline of an RRBSS in operation. A beacon 620 indicates the beginning of a TBTT 610, which comprises an Ad-hoc Traffic Indication Message (ATIM) window 660, a Round Robin Period (RRP) 670, and a Contention Period (CP) 680. During the ATIM window, only ATIM frames are permitted, which indicate presence of traffic for the receiving station. The ATIM window is accommodated unchanged in this embodiment. Alternate embodiments need not support ATIM. RRIFS spacing is not detailed in FIG. 6. The RRP is comprised of a series of RR Transmission Opportunities (RR TXOPS) 630A-630N for each of N STAs in the RR List. Each STA in the list transmits a respective token 640 to transfer access to the shared medium to the next STA in the RR List. Note that a STA need not utilize its RR TXOP, but may simply transfer access to a next station with a token 640 (for example, note that token 640B transfers access from STA B to STA C, followed by STA C transferring access to STA D with token 640C, without an intervening RR TXOP). The last STA in the RR List (STA N) terminates the RRP by transmitting an end token 640N. In an example embodiment, an end token is identified by transmitting a special RRID (for example, all zeros), to indicate the RRP is complete.

Following the RRP is the CP, in which any STA may contend for access. In the example embodiment, DCF (or other 802.11 contention access procedures) may be used for general communication by any STA, and may be used to perform various control functions (i.e. adding STAs to the RR List, or establishing flows between STAs, etc.), examples of which are detailed further below. These transmissions are illustrated generally as frames 650A-N in FIG. 6. The end of a TBTT and the start of a new one is indicated by another beacon 620. Example embodiments and procedures to illustrate various features are illustrated below. For clarity of discussion, an 802.11 IBSS and DCF type access may be assumed. RR STAs may be referred to as MIMO STAs to differentiate from other STAs, referred to as legacy STAs. It is clear that STAs other than those employing MIMO techniques may also be adapted for use in an RRBSS. Those of skill in the art will readily adapt equivalent techniques for use in alternate embodiments, and for interoperability with networks other than those contemplated by 802.11 standards and their derivatives.

Once an RRBSS is initialized, the Beacon is transmitted by the first STA in the RR schedule for the current Beacon interval. This is different from the beacon transmission methodology in legacy 802.11 IBSS, where stations contend to transmit the beacon. The order of STAs in the RR schedule rotates every Beacon interval so that the STA that transmits last in Beacon interval k, transmits the Beacon in Beacon interval k+1. Reordering the RR List is optional, but may be used to distribute monitoring and control functions (and the ability to save power by avoiding such procedures) among the STAs in the RRP. Alternate reordering schemes to rotating are envisioned and will apparent to those of skill in the art.

It may be desirable to set the ATIM Window to end immediately following a beacon transmission. This will disallow legacy sleep mode. MIMO STAs in an RRBSS may use various sleep mode procedures enabled by the RR schedule, examples of which are described below. If the medium is shared with legacy STAs, the RRP follows immediately after the ATIM Window expires, if ATIM is supported.

In the example embodiment, STAs participating in the EBSS or RRBSS respect the TBTT and terminate any on-going transmission at the expiration of the TBTT. This allows for a more regular period of the RRP. However legacy STA transmissions may extend beyond the TBTT and cause jitter in the beacon transmission. Techniques described herein allow interoperability with legacy STAs.

Long and short tokens are defined in the example embodiment to allow for reduced overhead. Example long and short tokens are detailed further below. In alternate embodiments, a single token (such as the long token defined herein, as well as any other type of token) or additional token types may be deployed. For clarity, example embodiments will be described using a set of RR parameters. In this example, the RR List may comprise up to 15 RR STAs, thus the RRID is a 4 bit value. The "0000" RRID is reserved for special purposes, such as indicating the end token, as well as other techniques, such as removing an RRID from the RR List (detailed below). Other RRID values could be substituted in alternate embodiments. Other token types could alternately be introduced to indicate end tokens as well. Those of skill in the art will readily adapt these embodiments using any number of alternate parameter sets.

In an example embodiment, basic Round Robin operation proceeds as follows. In an existing or newly formed IBSS, the first STA that desires to start using a periodic transmission to satisfy its QoS flow(s) obtains a TXOP through DCF procedures and transmits a (broadcast) Long Token PPDU that contains a 4-bit RRID (other than 0000) that is not already in use by another STA. To reduce the probability of two STAs picking the same RRID at the same time, the length of the RRID field can be increased. As described above, the RRID value 0000 has special meaning. As additional STAs join the RR schedule, each STA picks its own RRID from among unused ones and adds itself to the RR schedule as discussed below. Any technique for assignment or selection of RRIDs may be deployed.

Figure 7:
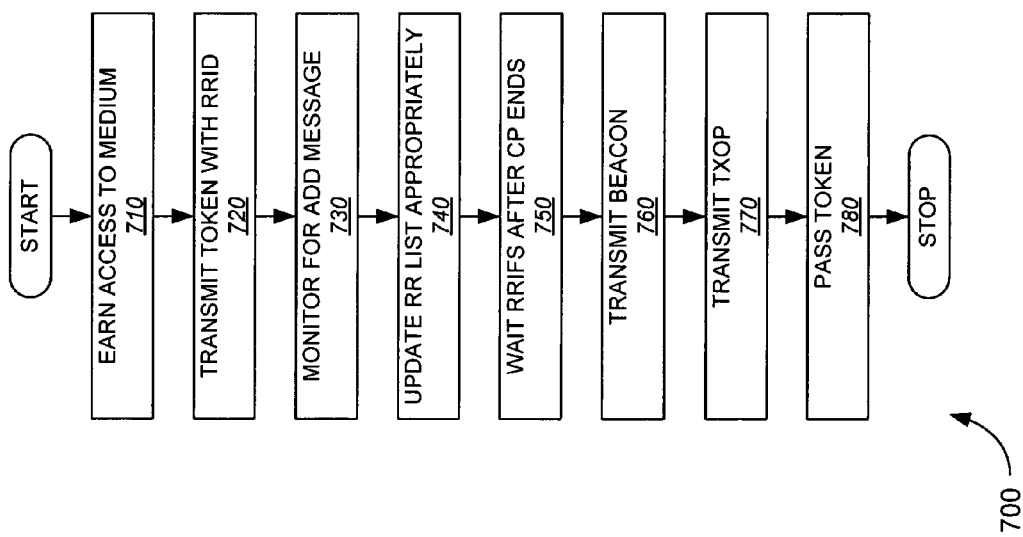
FIG. 7 depicts an example embodiment of a method for initiating an RRBSS within an IBSS.

FIG. 7 depicts an example embodiment of a method 700 for initiating an RRBSS within an IBSS. At 710, a STA, intending to initiate an RRBSS earns access to the shared medium. In one embodiment, this is performed with DCF procedures during the CP. Alternate systems may specify alternate methods for gaining access. At 720, once access is earned, the STA transmits a token with its selected RRID. At this point, the RR List is comprised of a single STA's RRID, that of the initiating STA. As described further below, other STAs may observe this token transmission (or another in a subsequent RRP) and take steps to join the initiating STA in the RRBSS. At 730, during one or more defined periods (the CP in the example embodiment), the STA monitors for an add message from another STA. Example add messages are described below, but an alternate embodiment may deploy any type of message. At 740, upon receiving one or more add messages, the STA updates the current RR List appropriately for the addition of one or more STAs to form a new RR List (optionally subject to an approval process, which may factor in the type of traffic desired by the requesting STA, available bandwidth, supportable rates with the requesting STA, and the like). When more than one STA joins the RR List, each must select a unique RRID. In one example embodiment, only a single STA may add during each TBTR, although this is not mandatory. An example technique for arbitrating multiple add messages is to select the first validly received request.

In the example embodiment, at 750, the STA waits a duration after the CP ends. In this case, the duration is RRWFS which gives the STA priority over the other STAs, who would wait DIFS (plus an applicable backoff). This allows the STA to seize the medium to initiate the RRP for this TBTT. Alternate networks may utilize differing techniques for determining the end of one period (the TBTT, for example), and beginning a new one. At 760, the initiating STA (also the last STA and only STA in the current RR List) is responsible for initiation of the new RRP, and does so by transmitting a beacon. Following the beacon, at 770, the initiating STA may transmit a TXOP if a target has been previously defined in another procedure (not shown). Once completed, or if no TXOP is desired, the initiating STA passes a token to the newly added STA, including other RR parameters defined in the token (examples are detailed further below). Thus, a new RRBSS has been initiated, and the beginning of typical RRBSS communication has begun.

As STAs join, leave, or re-insert themselves in the RR schedule, the changes in the RR schedule are tracked through a global variable RR Seq. The RR Seq is incremented every time a STA either joins, leaves, or reinserts itself in a different position in the RR schedule. The RR Seq is included as a field in both the Short Token PPDU and Long Token PPDU, detailed further below. Alternate embodiments may use alternate techniques for alerting STAs of changes to the RR schedule (as well as other RR parameters).

Figure 8:
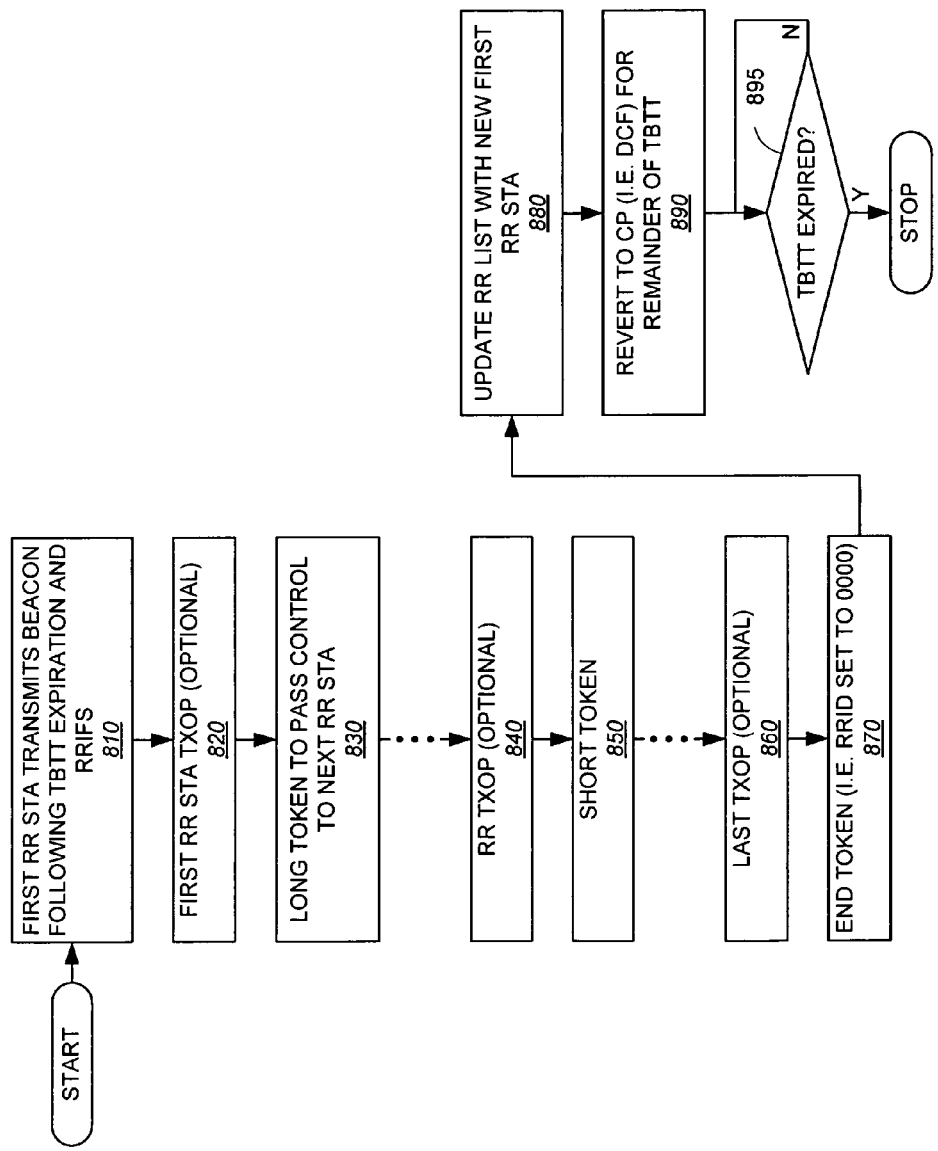
FIG. 8 depicts an example embodiment of a method for typical RRBSS communication.

FIG. 8 depicts an example embodiment of a method 800 for typical RRBSS communication, an example of which is described above with respect to FIG. 6. At 810, immediately following the expiration of the TBTT, the last STA on the RR schedule of the previous Beacon interval (i.e., the previous RRP) transmits the Beacon after waiting for a RRIFS gap. As described above, the RRWFS gap is a shorter delay or duration than the DCF inter-frame spacing (DIFS). In this example, the DIFS is the minimum inter-frame spacing that can be used by any other STA in the IBSS. This gives the STA with the token priority to access the medium, over other contending STAs. In one embodiment, the RRIFS is chosen to be equal to the PIFS, since no AP is present, and thus there is no conflict with an AP. As described above, in an alternate embodiment, RRIFS may be shortened to allow priority of the RRBSS over an AP, if present.

At 820, the first RR STA may transmit according to its TXOP, if desired. At 830, a long token is transmitted to pass control to the next RR STA, as indicated in the current RR List. If the next RR STA does not transmit at the RRIFS, at the expiration of an additional delay, control of the medium reverts to the STA that transmitted the Beacon in the previous Beacon interval. Thus, the RR schedule does not rotate for this Beacon interval. The additional delay may be set to any value, although in the example embodiment it is desirable that the total idle channel time be less than DIFS in order to guarantee that the RR STAs maintain control of the medium during the RRP. This condition is detailed further below, and, for clarity, not illustrated in FIG. 8.

As shown, a series of zero or more RR TXOPs may be transmitted by RR STAs sequentially as indicated in the RR List, followed by the transmission of a token to pass control of the medium to the next STA on the RR List. The token passed at each stage may be a short token (generally desired to reduce overhead) or a long token when additional information or control is required (detailed further below). For example, an RR TXOP may be transmitted at 840 (optional), followed by a short token at 850 (the token is not optional, but techniques for failure recovery may be defined, examples of which are described below). At the completion of each RR TXOP, each RR STA passes the token to the next STA on the RR schedule. In this example, the STA explicitly indicates the end of an RR TXOP by transmitting a Token PPDU that contains the RRID of the next STA on the RR schedule (other techniques, including implicit addressing may be adapted in alternate embodiments in light of the teaching herein). In this embodiment, the first STA in the RRP always passes control using the Long Token PPDU. Other conditions in which a STA needs to transmit the Long Token PPDU are discussed below. Each next STA on the RR schedule receives the token and acquires control of the medium after waiting for a RRIFS duration. Any transmission from such a STA serves as an implicit acknowledgment of the token passing. Thus, control passes from the STA with the entry j on the RR schedule for the current Beacon interval to the STA with entry j+1 on the RR schedule. At 860, a final TXOP for the RRP (if any) is transmitted.

At 870, the RRP of the Beacon interval ends when the last STA on the RR schedule completes its transmission and transmits an end token. This is indicated, in the example embodiment, by the transmitting STA setting the Next RRID field in the token to 0000 (alternate special values may be substituted in alternate embodiments). Bandwidth management and fairness procedures may be included in an RRBSS system, examples of which are detailed further below. In this example, the RRP needs to end no later than indicated in the RRP Fraction field of the Token.

At 880, to distribute the monitoring and control requirements among the STAs in the RRBSS, the RR List is updated. The RR List is updated with a new first RR STA, which will initiate the next RRP. As described above, in the example embodiment, the RR List is rotated such that the last STA becomes the first STA, and all others shift by one position. Such reshuffling is optional, and alternate shuffling procedures may be substituted in alternate embodiments.

At 890, the medium reverts to an alternate access scheme. In this example, distributed coordination function (DCF) operation is employed until the next TBTT. This period is referred to as the contention period (CP). In alternate embodiments, any other type of access scheme may be deployed (whether or not contention-based), and alternate techniques for reacquiring control of the medium for subsequent RRPs may be deployed. Other RR signaling may be initiated during the CP, as described below. Examples may include adding STAs or initiating or negotiating new flows. At decision block 895, the process loops until the period (i.e. the TBTT) has expired. Method 800 may be repeated indefinitely while the RRBSS is active.

In the example embodiment, STAs with non-QoS flows that do not participate in the RRP may transmit during the CP using DCF procedures. Note that, in alternate embodiments, data transmitted during the RRP is not required to be a QoS flow, but QoS flows serve as a good example for the use of an RRBSS. TXOP transmissions during the CP do not need to end with an explicit token (unless otherwise required when an alternate access procedure is deployed during the period subsequent to the RRP). A STA that intends to participate in the CP may determine the beginning of CP transmission if it either decodes a token with the Next RRID set to 0000 (if the STA is equipped to detect RR signaling), or if it observes a non-RR TXOP (for example, the end of a TXOP with no token transmission).

As described above, each RR TXOP ends with the transmission of a Token PPDU to transfer control of the medium to the next STA on the RR schedule. In this example, the end of the RRP is indicated through the transmission of a Token with the Next RRID field set to 0000. Typically, a STA with an entry in the RR schedule needs to transmit at least one frame during its scheduled RR TXOP. However, as described above, if the STA does not have any buffered frames, it transmits either a Short Token or a Long Token to maintain its position in the RR schedule. Again, in this example, a STA that transmits first in a Beacon interval transmits the Long Token (for reasons described further below). Additionally, following an increment in the RR Seq (due to a change in the RR List, or various other RR parameters, depending on the specific embodiment of the short or long tokens), each RR STA needs to transmit the Long Token at least once. For example, a STA also transmits a Long Token at least once if its receive connectivity list has changed (detailed further below).

The techniques and embodiments disclosed herein may be adapted for use with various alternate types of communication networks (both wired and wireless). The transmission format (for example, modulation type, rate, power level, encoding, etc.) of the data transmitted during the TXOP may be of any type. Techniques available with a deployed communication format may be incorporated with both transmission and reception of TXOPs, as well as with tokens (note that a token need not be a discrete message, as illustrated herein, but may be combined with data, message, or signal transmission of various types, as will be apparent to those of skill in the art). For example, in the illustrative 802.11 environment, the following procedures may be incorporated. When a STA on the RR schedule acquires control of the medium to transmit its scheduled RR TXOP, it may use protection (e.g. RTS/CTS) for frame transmissions during the RR TXOP. It may use immediate ACK, or the delayed ACK and block ACK procedures of 802.11e. It may transmit frames to one or more STAs. It may transmit one or more aggregated frames. As enhancements are introduced to the 802.11 standards, as well as any new systems are developed, it is envisioned that available transmission and reception procedures will be readily adapted to incorporate the principles disclosed herein by those of skill in the art.

Figure 9:
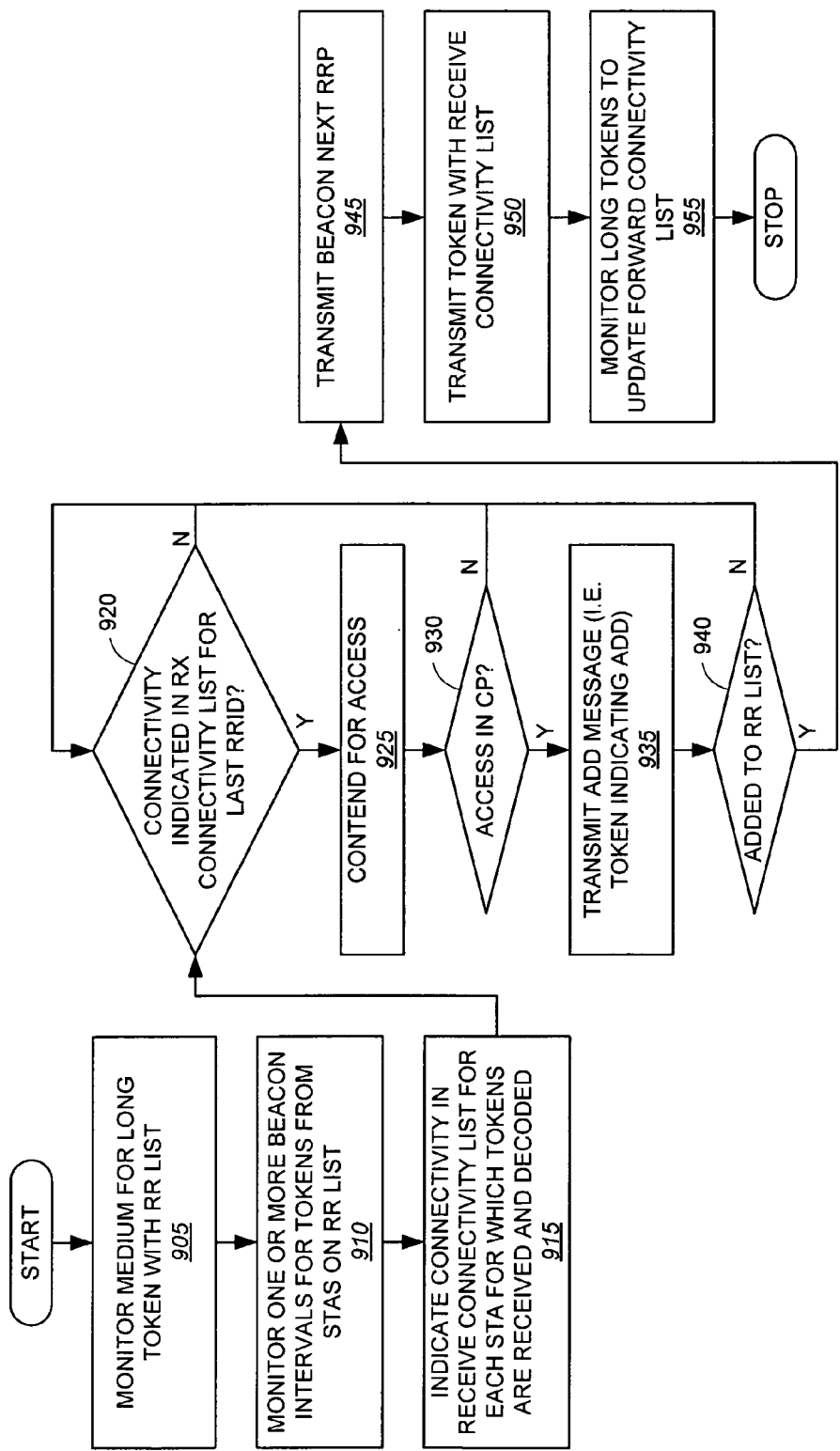
FIG. 9 depicts an example embodiment of a method for a STA to request to add itself to the RRBSS, as well as for generating a receive connectivity list and a forward connectivity list.

FIG. 9 depicts an example embodiment of a method 900 for a STA to request to add itself to the RRBSS, as well as for generating a receive connectivity list and a forward connectivity list (suitable for use in conjunction with example methods 1000 and 1100 for adding a requesting STA, propagating updated RR Lists, and updating other STA's receive and forward connectivity lists, detailed further below.) When a STA intends to join the RR schedule, at 905, it listens to the medium for a Long Token that contains the RR List. Once it has a copy of the RR schedule, at 910, it listens to the medium for one or more Beacon intervals to construct its receive connectivity list. At 915, for each (Long or Short) Token transmission that it is able to decode during the listening interval, the STA sets the corresponding bit in its receive connectivity list to 1. Note that the receive connectivity list only indicates which STA tokens have been decoded at this STA, but not whether those STAs will be able to decode token transmissions from this STA. The forward connectivity list will be created subsequently once this STA joins the RR schedule, detailed below. Note further that any technique for forming or maintaining connectivity lists may be deployed, equivalents of which will be apparent to those of skill in the art. In this example, the connectivity lists are 15 bit fields, with each bit set or reset in accordance with connectivity associated with the corresponding STA in the RR List. Naturally, reordering of the RR List will be followed with corresponding reordering of the connectivity lists (using the appropriate functions for reordering based on the selected list construction).

To join the RR schedule, the requesting STA contends for access during the CP of a Beacon period in which the Last RRID is of a STA for which the connectivity bit is set to 1 in the requesting STA's receive connectivity list. At decision block 920, the requesting STA loops until this condition is met. When it is, at 925, the requesting STA contends for access. Once access is earned, as shown in decision block 930, the requesting STA transmits an add message at 935. If access is not earned, return to decision block 920 (one or more RRPs may transpire before the condition of decision block 920 is again met). In the example embodiment, the add message is a Short Token PPDU transmitted by the requesting STA in which it inserts its chosen RRID and sets both the Next RRID and Last RRID fields to the last RRID in the RRP cycle (for which connectivity is indicated in the receive connectivity list). Since the request may not be receivable by the last RRID, optional conditions for addition to the RRBSS may not be met, or the maximum number of add messages may have already been received (one message, in the example embodiment), the requesting STA determines if it has been successfully added to the RR List in decision block 940. If so, proceed to 945. If not, return to decision block 920 to attempt a subsequent request (in an alternate embodiment, steps 905-915 may also be repeated at desired intervals to maintain the current RR List and connectivity list, as described). Example techniques for indicating a successful addition to the RR List are detailed below with respect to FIG. 10.

Figure 10:
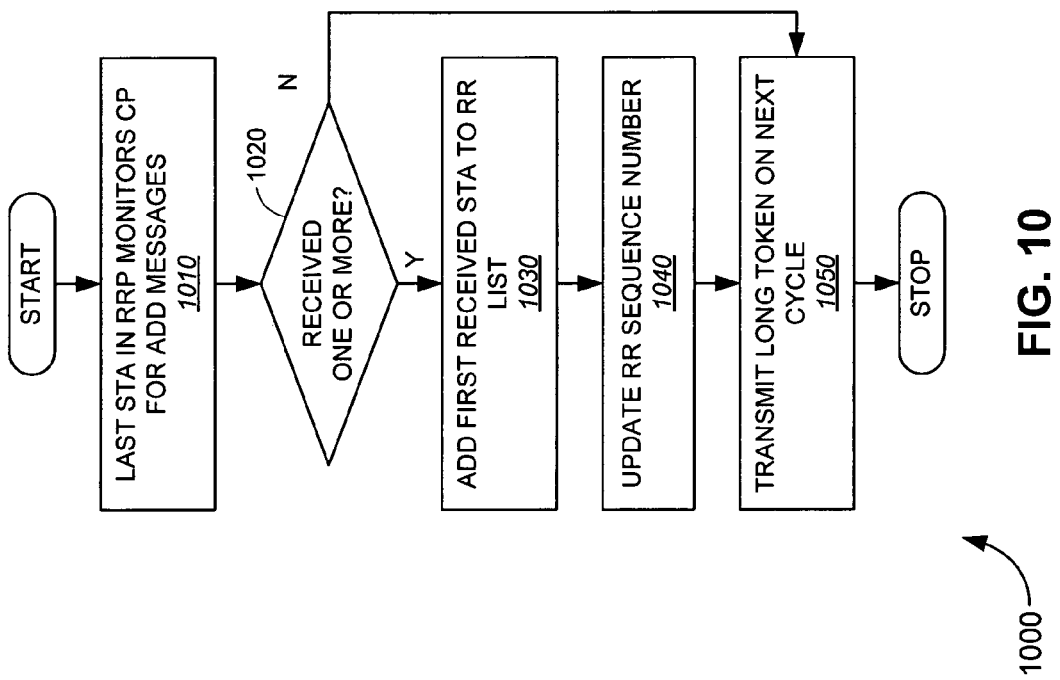
FIG. 10 depicts an example embodiment of a method for processing add requests.

FIG. 10 depicts an example embodiment of a method 1000 for processing add requests. At 1010, the last STA in the RRP monitors the medium during the CP for add messages. Note that in alternate embodiments, add requests may occur using techniques other than the described contention based techniques, or at alternate periods within the TBTT (or other interval). Also, an alternate STA or STAs may be tasked with processing such requests. Add requests may be allowed once each period, as illustrated, or may be allowed with higher or lower frequency. These modifications will be apparent to those of skill in the art.

At decision block 1020, if the last STA in the RRP receives one or more add messages, proceed to 1030. If no add messages are received in the TBTT, proceed to 1050 to transmit the long token on the next RRP cycle. In this case, the RR List is not changed, except for any RR List shuffling that may be desired. In the example embodiment, the last STA rotates and becomes the first STA for the next RRP, and thus transmits the first long token (subsequent to the beacon) on the next cycle. (Various other steps, detailed elsewhere herein, are omitted in FIG. 10 for clarity of discussion).

At 1030, if one or more add messages have been successfully received (i.e., the STA is able to decode the contention based access), the last STA selects the first validly received message and adds the associated RRID to the RR List. In alternate embodiments, one or more STAs may be added in any order to an RR List, as will be apparent to those of skill in art. While the new RRID could be placed anywhere in the RR List, in this example, it is placed at the end, as explained further below. At 1040, the RR sequence number (RR Seq) is updated to indicate that the RR List has changed (alternate RR sequence identification techniques may also be deployed). As before, at 1050, the last STA becomes the first STA in the next RRP and transmits the long token (after the beacon) comprising the new RR List and the updated RR Seq. Method 1000 may be repeated by each last STA, following each RRP, to monitor for add requests. Note that alternate embodiments may provide for one or more add periods other than or in addition to the time period following the RRP.

Return now to FIG. 9. As described above, in decision block 940, the requesting STA determines if it has been successfully added. As described in FIG. 10, if the requesting STA receives the first token in the next RRP, and sees its RRID in the RR List (at the end, in this example), then the determination is made that the request was accepted. Since this new STA is added at the end of the RR sequence, it receives access to the medium last, and transmits the end token. As described above, it then becomes the first STA for the next RRP. Thus, at 945, in the following beacon interval it transmits the beacon, as well as the first token. At 950, the first (long) token is transmitted including its receive connectivity list. Remote STAs that hear the long token may update their receive connectivity lists accordingly. Furthermore, remote STAs that see their corresponding bit set in the new STA's receive connectivity list may update their forward connectivity for the new STA, as the new STA has indicated that it receives from those respective STAs. These remote STA actions will be described further below with respect to FIG. 11.

At 955, the new STA monitors long tokens from remote STAs to update its forward connectivity list. In the current period, as described below, all the remote STAs that are awake and able to successfully decode messages from the new STA will transmit their updated receive connectivity list to indicate that the long token with modified RR List and incremented RR Seq is heard. If the new STA can also hear a remote STA, then it may update its forward connectivity list for that remote STA. Each STA may, in other processes, and at other times, update its forward connectivity list by receiving a receive connectivity list from a remote station (any time that station has reason to send a long token). STAs may also periodically monitor beacon intervals in their entirety to detect new STAs, and add their respective RRIDs to their respective receive connectivity lists (power save features that call for STAs to sleep are detailed further below). Two-way communication between two STAs is possible when the corresponding bits in their respective receive connectivity lists and forward connectivity lists are both set.

Figure 11:
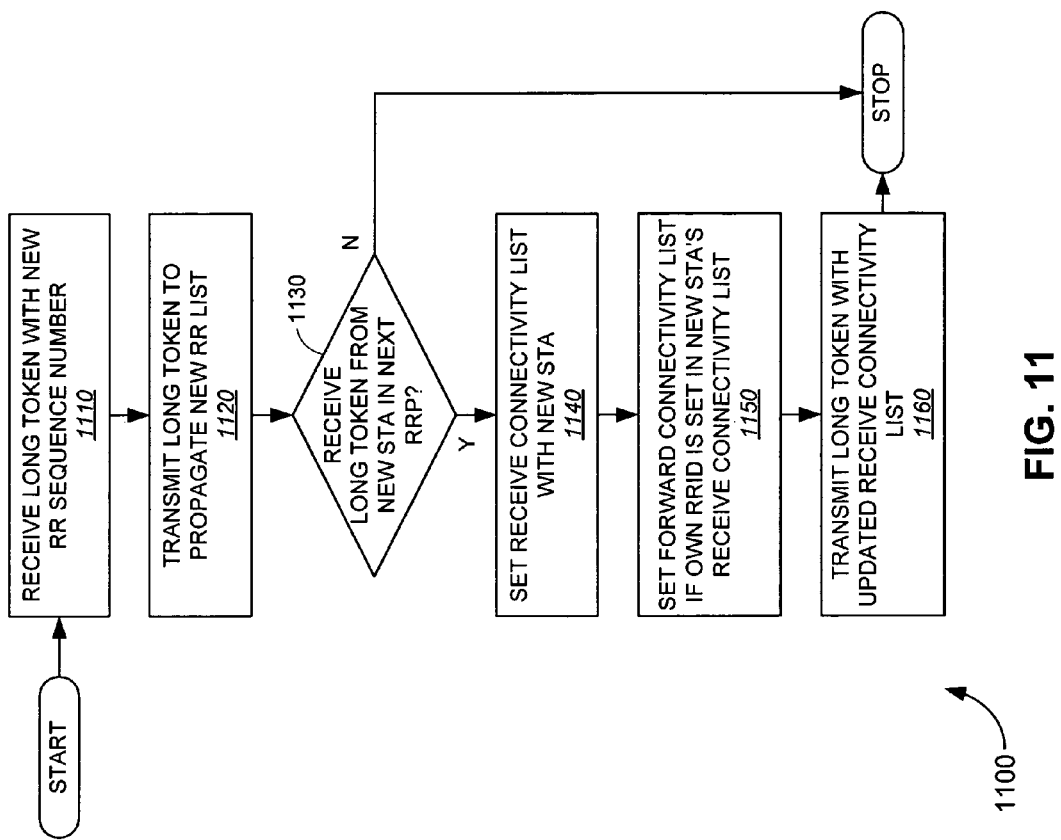
FIG. 11 depicts an example embodiment of a method for propagating updated RR Lists and updating receive and forward connectivity lists in response to newly added RR STAs.

FIG. 11 depicts an example embodiment of a method 1100 for propagating updated RR Lists and updating receive and forward connectivity lists in response to newly added RR STAs. Various steps detailed in this figure correspond with remote STAs responding to messages from the monitoring STA indicating a new RR List, and responding to messages from the new STA. These steps allow for changes in the RR sequence to propagate, and, as described above, facilitate STAs updating their connectivity lists.

At 1110, a STA receives a long token with a new RR sequence (RR Seq) number, indicating there is a change. In this example, the new STA has been added to the list. At other times, as detailed further below, the RR Seq may be updated when a STA leaves (or is forced out), or other parameters have changed requiring propagation (in alternate embodiments). At 1120, the STA, subsequent to any TXOP communication, transmits a long sequence with new RR List, which allows the new information to propagate to all STAs that are able to hear that long token. The long token is transmitted whenever a token with an updated RR Seq is received. Note that, in an alternate embodiment, other token formats may be defined, and the concepts described herein will be readily adapted to these alternate formats. For example, a single token may be defined that includes all the RR information and is transmitted each time the token is passed (while this may simplify some procedures, although control overhead may be increased).

At decision block 1130, if a STA has received the long token from the added new STA in the next RRP, proceed to 1140. If not, then the process may stop. In this case, unless otherwise obligated to do so, the STA will terminate its TXOP, if any, with a short token. Thus, as detailed above in FIG. 9, the new STA will not receive a connectivity list indicating successful reception, and the new STA will not update its forward connectivity list as a result. Note that if conditions change for reception to be accomplished (or if the STA was sleeping in some form of power save mode), subsequent long tokens may be used to update connectivity lists, as detailed above.

At 1140, having successfully decoded the token from the new STA, the receiving STA sets the field or bit in its receive connectivity list corresponding to the new STA. At 1150, the receiving STA examines the receive connectivity list of the new STA, and, if the field or bit associated with the receiving STA is set in that list, the receiving STA knows that the new STA also hears its transmissions. If the field is not set, then the receiving STA can hear the new STA, but the new STA is not capable of receiving. Thus, the forward connectivity of the receiving STA is updated appropriately.

At 1160, the STA transmits the long token with the updated receive connectivity list. For each station receiving this list, including the new STA, forward connectivity lists may be updated in accordance with the settings, as appropriate. The setting of the new STA's forward connectivity list is described above with respect to FIG. 9. Every STA whose connectivity list changes needs to transmit the Long Token in the subsequent beacon interval. Method 1100 may iterate indefinitely for as long as the RRBSS is active.

Figure 12:
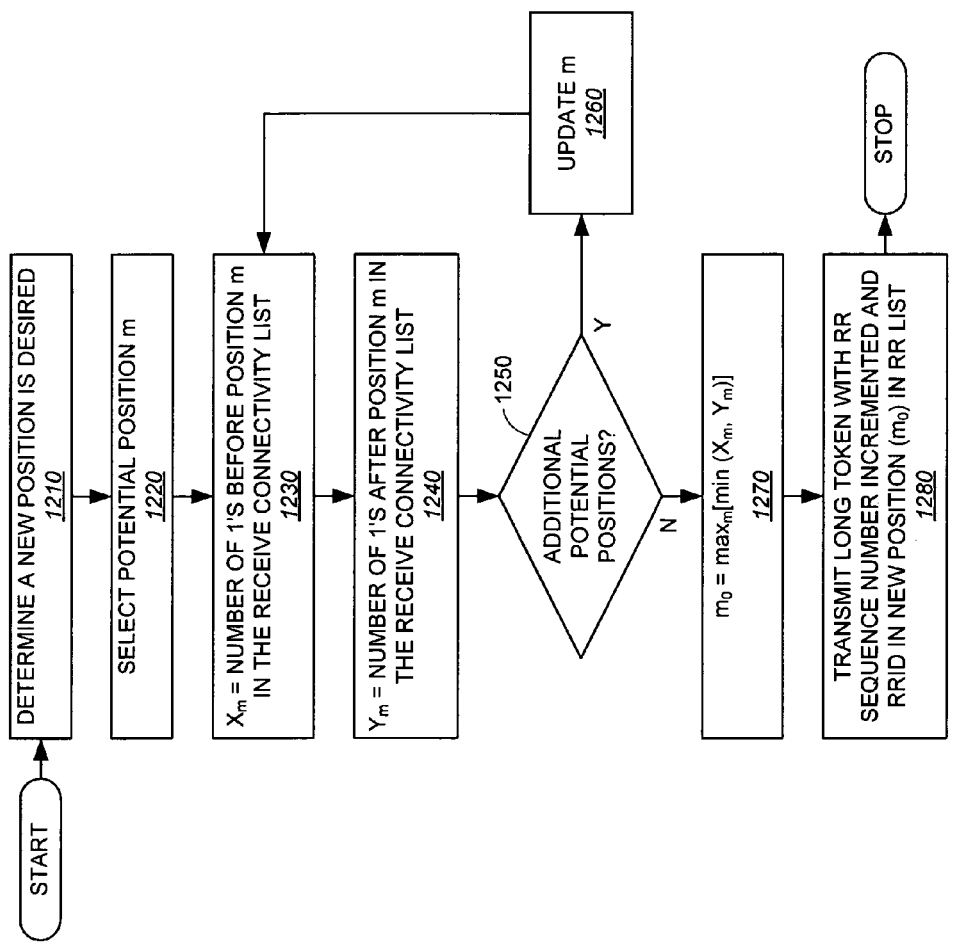
FIG. 12 depicts an example embodiment of a method for modifying the insertion point of a RR STA in the RR List.

FIG. 12 depicts an example embodiment of a method 1200 for modifying the insertion point of a RR STA in the RR List. At 1210, due to updates in its receive and forward connectivity lists and due to the arrival and/or departure of STAs from the RR schedule, a STA may determine from time to time that it would prefer to re-insert itself into a different position in the RR schedule. In this example, a new position $m_0$ in the RR List is determined as follows. At 1220, select a potential position m in the RR List. At 1230, compute $X_m$ as the number of 1's before position m in the receive connectivity list. At 1240, compute $Y_m$ as the number of 1's after position m in the forward connectivity list. At 1250, if there are additional potential positions to evaluate, update m at 1260 and return to 1230. If not, at 1270, select $m_0 = \max_m[\min(X_m, Y_m)]$. At 1280, to reinsert itself into a different position in the RR schedule, the STA transmits the Long Token PPDU with the RR Seq incremented and its RRID inserted into the different position in the RR List.

Figure 13:
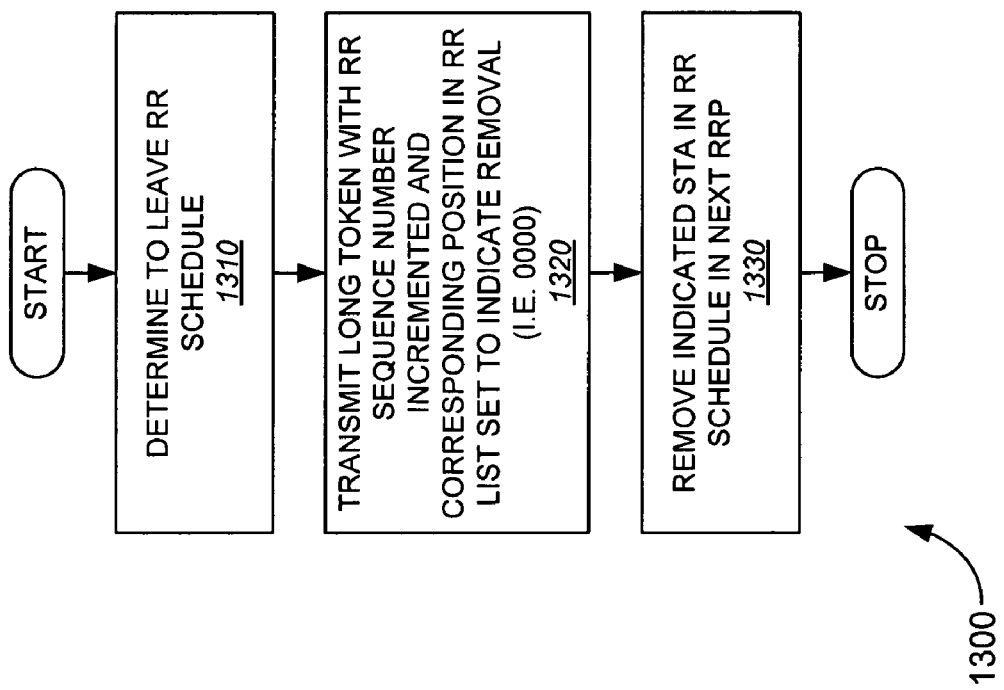
FIG. 13 depicts an example embodiment of a method for a STA removing itself from the RR List.

FIG. 13 depicts an example embodiment of a method 1300 for a STA removing itself from the RR List. At 1310, a station determines to terminate its participation in the RR schedule. At 1320, it transmits the Long Token PPDU with the RR Seq incremented and its position in the RR List set to 0000 (or another predetermined value in an alternate embodiment). As detailed above, STAs receiving the long token with the updated sequence identifier will propagate the changes (including one or more STAs setting their RR List positions to 0000) through the RR sequence. At 1330, the STA will be excluded from the RR schedule in the next Beacon interval. In the example embodiment, a STA terminates its participation in the RR schedule if it has not transmitted a non-Token PPDU in a predetermined number, $M_{RR}$, consecutive Beacon intervals. A nominal value for $M_{RR}$ is 8. This feature allows for removal of the overhead of token passing (as well as a RR slot, if supply is limited) when not being fully utilized. This technique allows each station to police itself. A STA may subsequently re-add itself using techniques described above.

Figure 14:
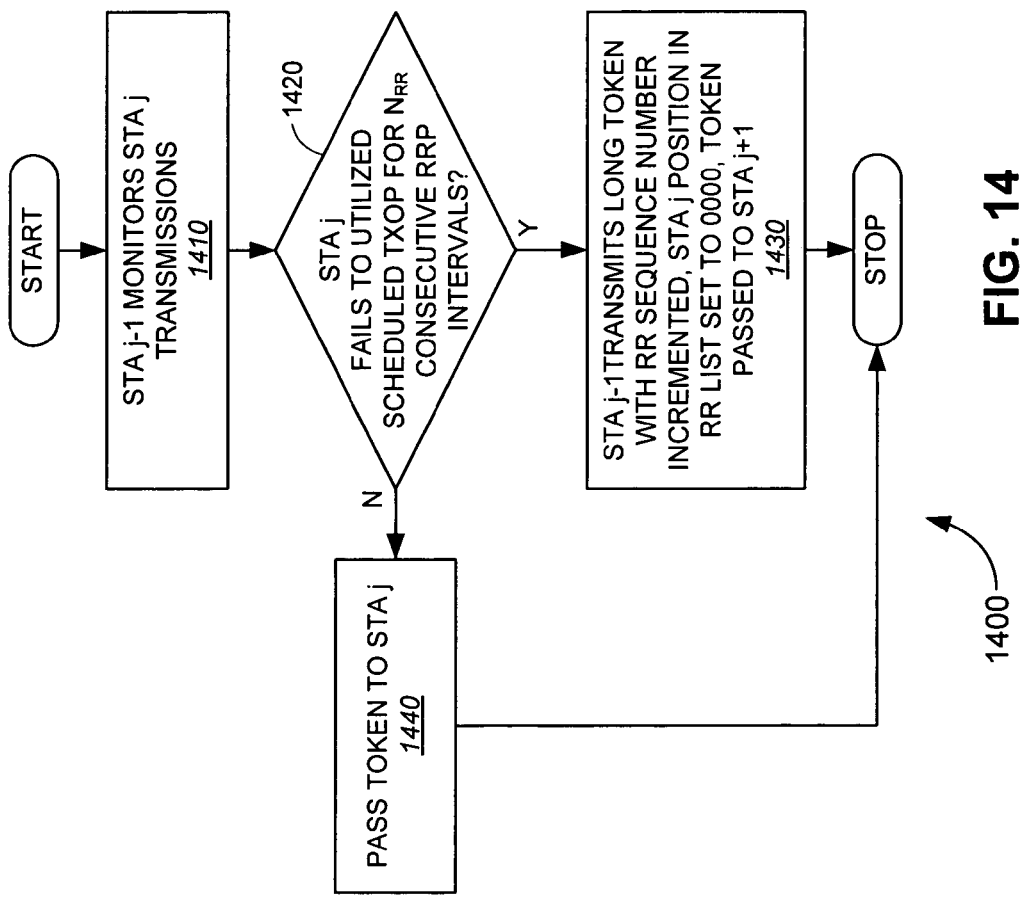
FIG. 14 depicts an example embodiment of a method for automatic removal of underutilizing STAs.

FIG. 14 depicts an example embodiment of a method 1400 for automatic removal of underutilizing STAs. This optional method may be deployed instead of, or in conjunction with, method 1300. If a STA on the RR schedule (entry j) fails to utilize its scheduled TXOP for $N_{RR}$ consecutive Beacon intervals, it automatically loses its place on the RR schedule. Alternate conditions may be substituted in alternate embodiments (for example, this technique may also be deployed when a STA fails to successfully pass a token repeatedly). At 1410, the STA with entry j−1 on the RR schedule monitors STA j transmissions. At 1420, if STA j has not failed to meet utilization requirements, then STA j−1 passes the token to STA j at 1440, as in typical RR communication. If STA j has failed to meet the utilization requirements, STA j−1 transmits a Long Token PPDU with the RR Seq incremented and the RR List entry corresponding to the STA j set to 0000 and passes the token to STA with entry j+1. This effectively removes STA j from the rotation. Other conditions may be imposed for remaining in the RRBSS (i.e. obeying other bandwidth management or fairness rules, or any other system parameter). Other STAs beside the prior STA in the schedule may alternately be tasked with monitoring. In any of these cases, the procedure described in FIG. 14 may be adapted to provide policing and removal of STAs from the RR List. Again, as described above, when there is a change in the RR schedule during a Beacon interval, all subsequent STAs in the RR schedule transmit the Long Token. For robust operation, when there is a change in the RR schedule (i.e., either a new STA joins, a STA leaves, a STA is removed from, or a STA reinserts itself into the RR schedule), all STAs in the next Beacon interval transmit the Long Token. A nominal value for $N_{RR}$ is 8.

Figure 15:
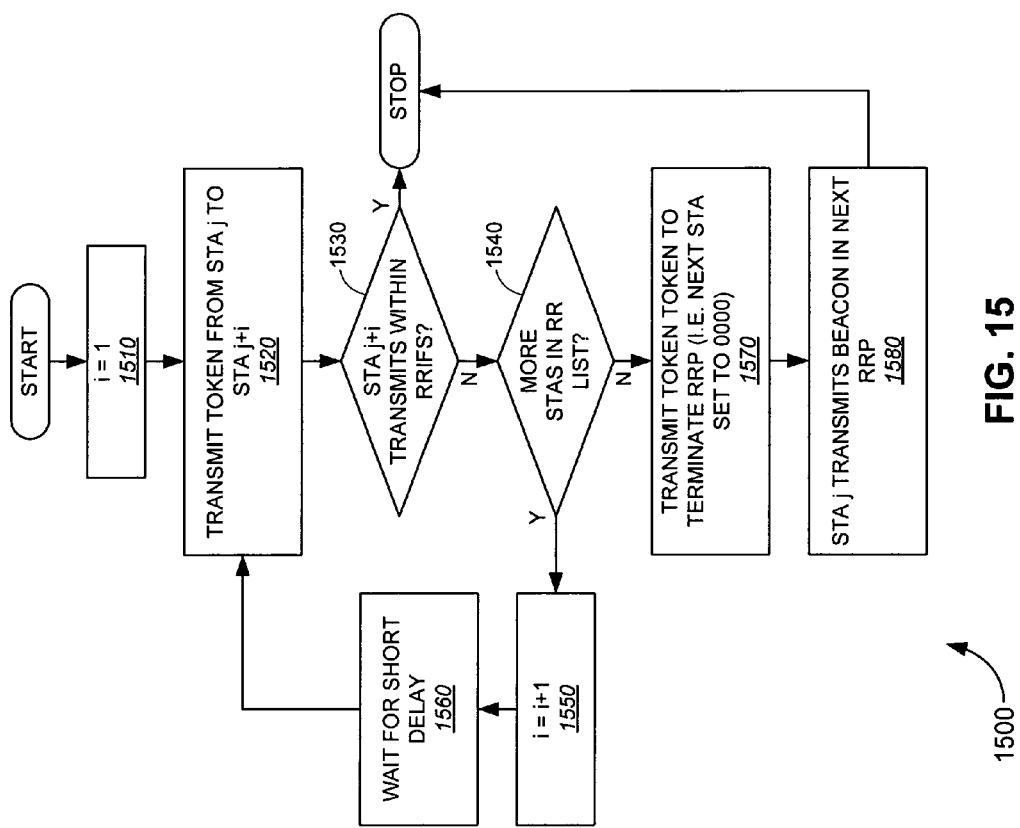
FIG. 15 depicts an example embodiment of a method for explicit token passing.

FIG. 15 depicts an example embodiment of a method 1500 for explicit token passing. As described above, in typical RR communication, each STA passes the token to the STA in the RR List. At 1510, set an index i=1. At 1520, transmit a token from a STA whose position is j in the RR List to the next STA (j+i, or j+1 in the first iteration). At 1530, when STA j+i transmits within RRIFS (or, in the example embodiment, at RRIFS), the token pass was successful, and the process may stop. If STA j+i does not transmit within the desired duration (RRWFS in this example), STA j will attempt to find another STA to receive the token. At 1540, if there are more STAs remaining in the list, increment i at 1550. At 1560, STA j regains control of the medium after a short delay. As described above, in one embodiment, the delay is set such that the RR STAs may retain control of the common medium. Return to 1520, where STA j attempts to pass the token to the next STA j+i. The process repeats until a successful token pass occurs or there are no more STAs in the list (at 1540). If the token pass fails, and the list is exhausted, at 1570, STA j transmits a token with the Next STA set to 0000 to indicate the end of the RRP. This indicates a premature termination of the RRP. At 1580, STA j acts as the last STA in the list and transmits the beacon and long token in the next RRP.

If a STA is unable to decode the Token PPDU transmission prior to its scheduled RR transmission, it defers transmission in the RRP during that Beacon interval. This ensures robust operation and avoids collisions. Bandwidth is not wasted since control is passed to subsequent STAs in the schedule using the method 1500 just described. The deferring STA may participate in the CP during that Beacon interval.

A STA that experiences several failed attempts to obtain a token during its RR TXOPs assumes that it has lost its place in the RR schedule and joins the DCF. It may again contend to join the RR schedule by transmitting in the CP, using techniques described above. Its previous entry in the RR schedule will expire after $N_{RR}$ or fewer Beacon intervals (depending on the implementation deployed).

As described above, various RR schedule shuffling methods may optionally be deployed. In the example embodiment, the RR schedule is rotated at each TBTT. Detailed further below is a method calling for random shuffling. The rotation (or alternate method of shuffling) of the RR schedule has a number of benefits: The Beacon is periodically transmitted by each RR STA, thus permitting the propagation of the information throughout the RRBSS. The order of transmission is changed, permitting fairness and better power management.

It is possible that RR schedule shuffling will result in a failure of a STA to take control when prescribed. Two example alternative solutions are described below. For illustration, consider the following schedule for Beacon interval k: B D F G H, where each letter indicates an RRID within the RR List.

In the first alternative embodiment, after it transmits first in a Beacon interval k, STA B remains awake throughout the Beacon interval. It uses this period to update its receive and forward connectivity lists, as described above. STA B explicitly passes the first position in the RR schedule for Beacon interval k+1 to the Last RRID (STA H). At the expiry of the TBTT, after waiting for a RRIFS gap, STA H needs to transmit the Beacon for Beacon interval k+1. If, for some reason, STA H does not transmit after the RRIFS gap, control reverts to STA B, which, after a short delay, transmits the Beacon for Beacon interval k+1 and concludes its TXOP with a Long Token. (In this case, the RR schedule rotation is postponed.) Based on the observation of transmissions in Beacon interval k, STA B may modify the RR schedule for Beacon interval k+1 to designate a different Last RRID. For example, STA B may remove STA H from the RR schedule, or STA B may re-insert itself in a different position in the RR schedule (e.g. between F and G, followed by transmission of the following schedule: B G H D F). This first alternative may not be robust if both STA H and B fail to transmit the Beacon. The RRBSS may be reinitiated in case of failure.

The second alternative may be implemented by relying on various STAs (e.g. STA F) measuring the channel (i.e. performing Clear Channel Assessment (CCA)) for robustness even if H and G both fail to transmit the Beacon. The method 1500 for passing a token reliably may be adapted for passing beacon control reliably, as will be apparent to those of skill in the art. For example, after it transmits first in Beacon interval k, STA B remains awake throughout the Beacon interval. It uses this period to update its receive and forward connectivity lists, as described above. STA B needs to explicitly pass the first position in the RR schedule for Beacon interval k+1 to the Last RRID (STA H). At the expiry of the TBTT, after waiting for a RREFS gap, STA H needs to transmit the Beacon for Beacon interval k+1. If, for some reason; STA H does not transmit after the RRIFS gap, control passes after a short delay to STA G, which transmits the following schedule: G H B D F. If STA G does not transmit the Beacon, control passes to STA F, and so on, until the list of potential STAs is exhausted or a successful beacon is transmitted.

Bandwidth, overhead, and/or fairness management may be deployed. In the example embodiment, bandwidth and overhead management is managed in the RRBSS through the RR Bandwidth Management field (examples detailed below) in the Token. The STA that transmits last in the RRP remains awake and observes the CP. During the next Beacon interval it updates the parameters of the Bandwidth Management field based on the observation of the RRP and the CP.

Figure 16:
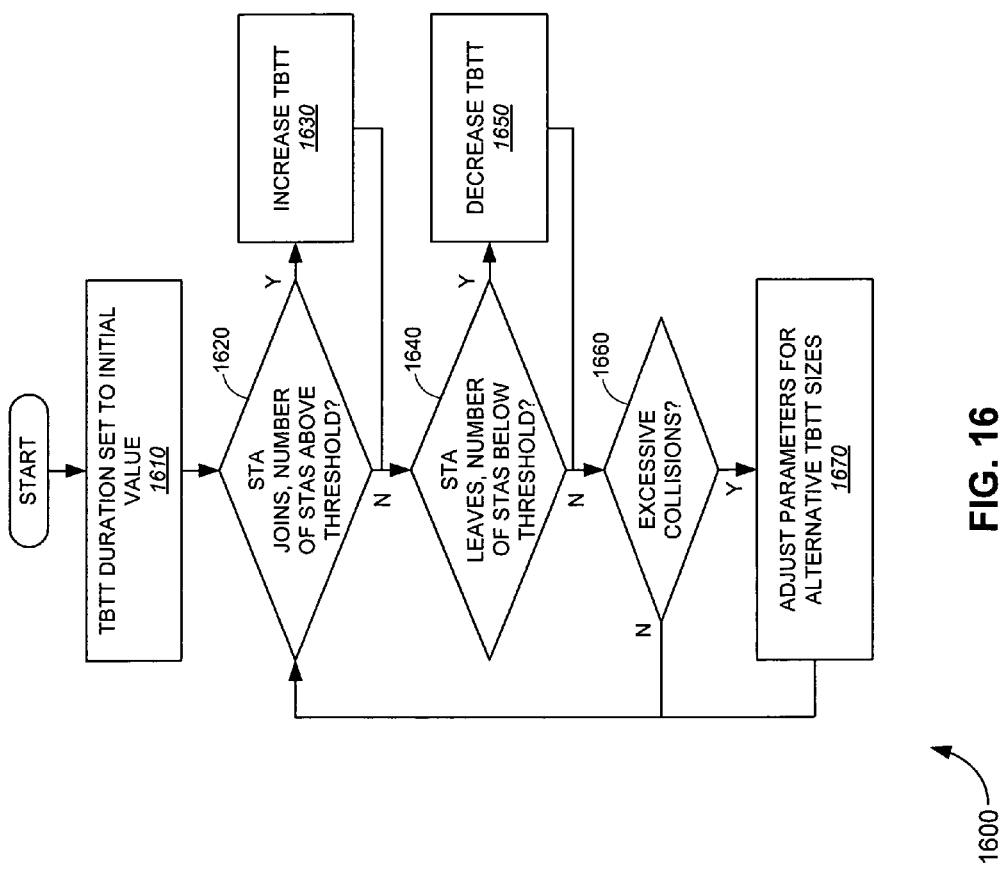
FIG. 16 depicts an example embodiment of a method for bandwidth management.

FIG. 16 depicts an example embodiment of a method 1600 for bandwidth management. To amortize token passing overhead, the TBTT can be varied. The TBTT may be changed at the start of each Beacon interval by the STA that transmits the Beacon. The TBTT value is included in the token. At 1610, the TBTT duration is set to an initial value. At 1620, if a STA joins, and the number of STAs is then above a predefined threshold, increase the TBTT at 1630. At 1640, if a STA leaves, and the number of STAs falls below a predefined threshold (which may be different than the join threshold), decrease the TBTT at 1650. An additional condition may optionally be deployed. At 1660, if excessive collisions are detected, the parameters may be adjusted for alternate TBTT sizes in 1670. The process may then be repeated with the new parameters. When collisions are reduced, the parameters may also be readjusted (details not shown. In the example embodiment, the following rules are used: The initial value of TBTT is set to 512 (1024) symbols. When a STA joins so that the number of STAs on the RR schedule increases above 9, TBTT is set to 1024 (1536) symbols. When a STA leaves so that the number of STAs on the RR schedule decreases below 7, TBTT is set to 512 (1024) symbols. If a STA determines that there are excessive collisions (perhaps requiring the use of RTS/CTS protection in the RRBSS) it may set the larger TBTT values shown in parentheses in the rules above. Those of skill in the art will recognize that various other values may be substituted based on the selected parameters for the RRBSS (i.e. number of STAs in the RR List, TBTT duration, and the like). Method 1600 may include finer adjustment in alternate embodiments, and thresholds and TBTT adjustments may be adaptable based on the channel environment, as will be apparent to those of skill in the art (details not shown).

Figure 17:
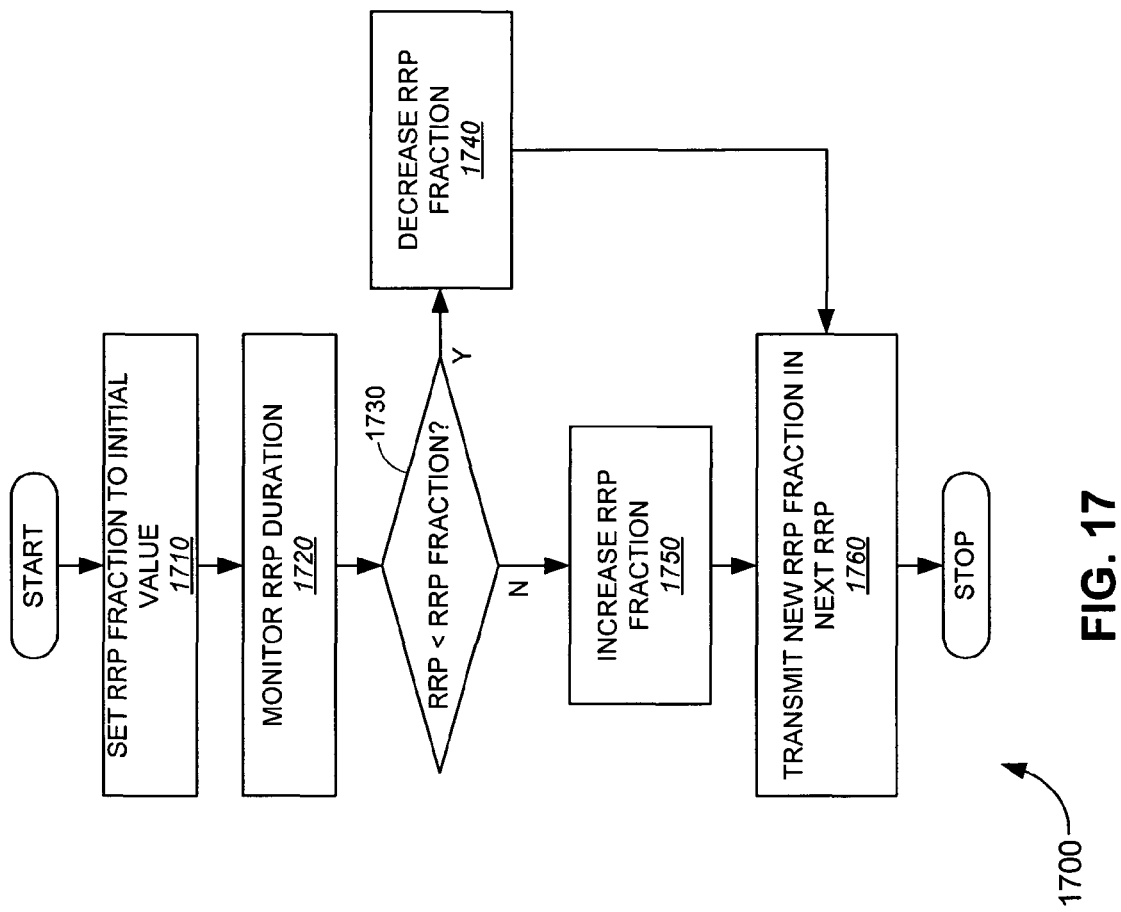
FIG. 17 depicts an example embodiment of a method for managing fairness.

FIG. 17 depicts an example embodiment of a method 1700 for managing fairness. In the example embodiment, fairness is managed in the RRBSS through the RRP fraction field in the RR Bandwidth Management field (examples detailed below) in the Token. At 1710, the RRP fraction is set to an initial value. At 1720, the STA monitors the RRP duration. At 1730, if the RRP duration is less than the RRP fraction, the RRP fraction is decreased in 1740, then proceed to 1760. At 1730, if the RRP duration is not less than the RRP fraction, the RRP fraction is increased at 1750. At 1760, the new RRP fraction is transmitted in the next RRP. The process may be iterated repeatedly during the RRBSS operation. Various modifications of method 1700 will be readily apparent to those of skill in the art. For example, premature end of the RRP may be excluded in adjusting the RRP fraction. Additional granularity of changes may be introduced (i.e. less or more increase or reduction based on the magnitude of the difference between the RRP duration and the RRP fraction). No change may be made when the RRP duration and RRP fraction are the same, or within a threshold of each other.

In the example embodiment, the rules to set the RRP Fraction for the current RRP are as follows: The initial value of the RRP Fraction is set to $^{12}/_{32}$. The Last STA in the RRP observes the end of the RRP and the entire CP to determine the RRP Fraction for the next Beacon interval. The RRP Fraction is decreased by $^{1}/_{32}$ if the RRP ends prior to the current value of RRP Fraction. The RRP Fraction is increased by $^{1}/_{32}$ if the RRP ends at or after the current value of the RRP Fraction. The RRP Fraction is increased by $^{1}/_{8}$ if one or fewer transmissions are observed during the CP. The RRP Fraction is left unchanged if the RRP ends prematurely.

Figure 18:
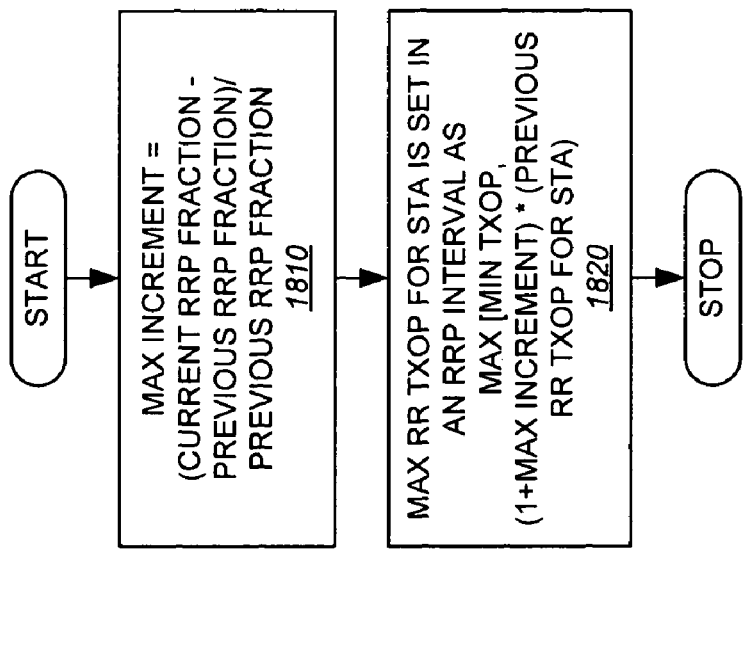
FIG. 18 depicts an example embodiment of a method for adjusting the TXOP duration for STAs.

Within each RRP, rules may be defined for allocating the RRP among the TXOPs of the STAs. FIG. 18 depicts an example embodiment of a method 1800 for adjusting the TXOP duration for STAs. In this example, the additional RRP available is distributed proportionately among the STAs.

Various alternative allocation schemes may alternately be deployed. At 1810, a Max Increment value for the current RRP is defined as (Current RRP Fraction—Previous RRP Fraction)/Previous RRP Fraction. At 1820, the maximum permitted TXOP for any STA in each RRP interval is determined as Max [MIN TXOP, (1+Max Increment)*(Previous RR TXOP)]. In the example embodiment, MIN TXOP is set to 16 OFDM symbols. Alternate embodiments may be deployed with alternate parameters, and other adjustments may be introduced, as will be apparent to one of ordinary skill in the art. Note that Max Increment may be positive or negative. The Previous RR TXOP is the length of the RR TXOP utilized by the STA in the previous RRP. In case an RRP ended prematurely prior to the STA obtaining a RR TXOP, the Previous RR TXOP variable is unchanged.

In each RRP, an RR STA may sleep after the completion of its RR TXOP and that of all of its correspondent STAs (i.e. those STAs for which a flow is established). Note that, in the example embodiment, each RR STA remains awake for an entire Beacon interval including the CP during the Beacon interval in which it is the Last RRID. Other examples have been described in which a STA may also need to remain awake to monitor transmissions during a beacon interval. STAs that wish to establish communication with a correspondent STA may do so in the RRP or CP in that Beacon interval or at any other time that they determine that the correspondent STA is awake. A STA not participating in the RRBSS may read the RRP Fraction field in any Token and may sleep for the period until the end of the RRP Fraction (although, if the RRP ends prematurely, the STA will be unable to utilize the additional CP).

Figure 19:
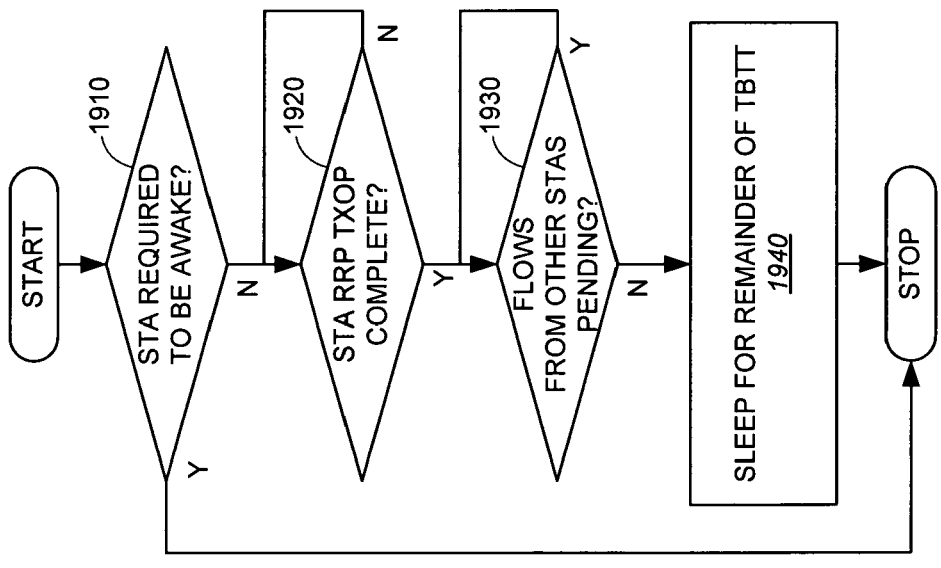
FIG. 19 depicts an example embodiment of a method for power save.

FIG. 19 depicts an example embodiment of a method 1900 for power save. At 1910, if the STA is required to remain awake for any reason, the process stops. At 1920, if the STA's RR TXOP is still pending, loop back to 1920. When the RR TXOP is complete, proceed to 1930. At 1930, if one or more flows are pending from other STAs in the RRP, the STA loops to 1930 and remains awake until they are complete. Once these conditions are met, the STA may sleep for the remainder of the TBTT.

In an alternate embodiment, an additional feature may be deployed. At least once every S beacon periods each STA does not go into power save mode. A STA with RRID A computes the value (A modulo S). A new field called Beacon Sequence Number (BSN) is added to the beacon. The BSN is incremented every TBTT. At each TBTT, the STA computes (BSN modulo S) and if this number is equal to (A modulo S), the STA does not go into power save mode until the next TBTT. This permits potential correspondent STAs to communicate with STA A during the CP.

Figure 20:
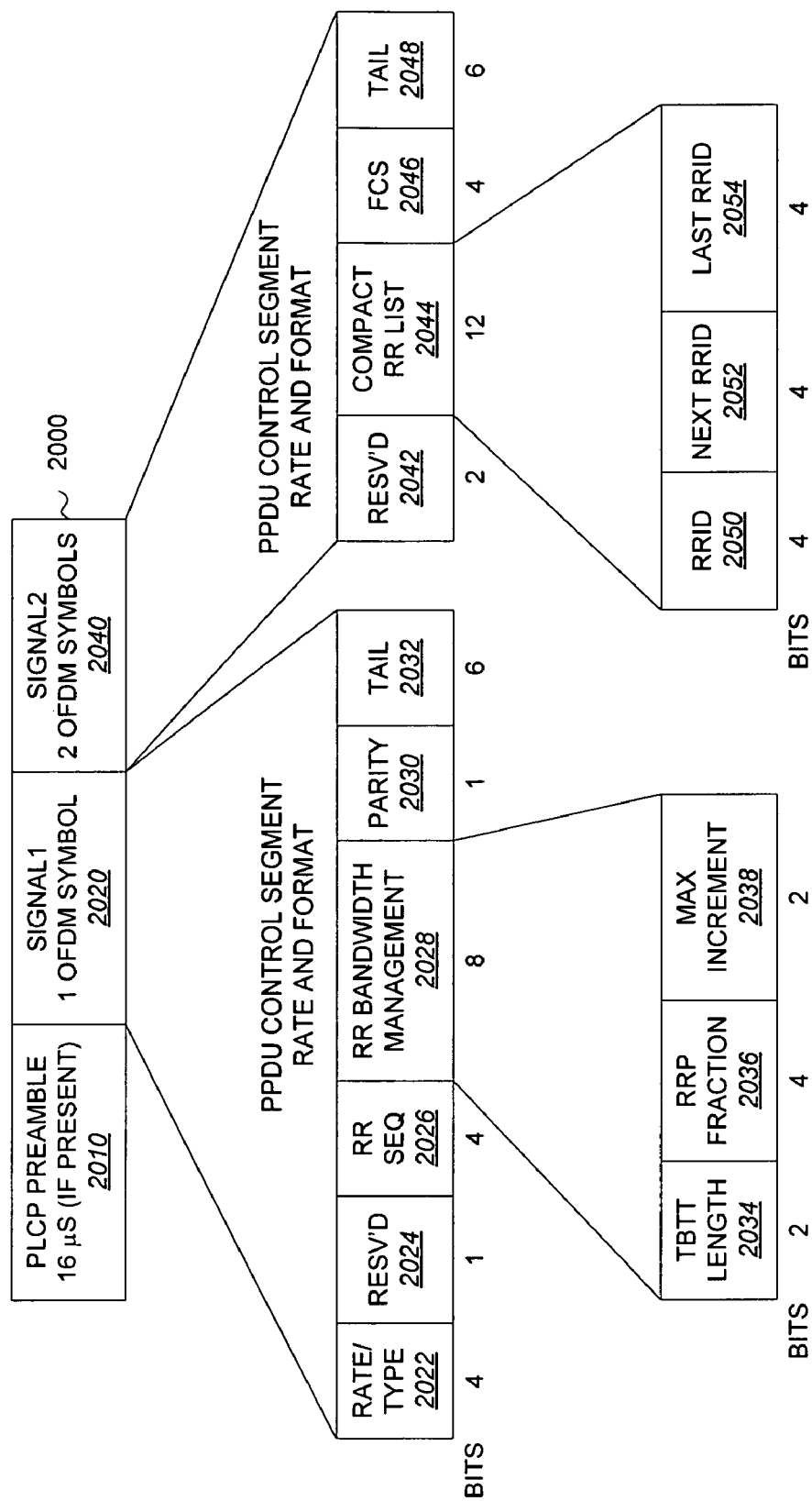
FIG. 20 is an example embodiment of a short token.
Figure 21:
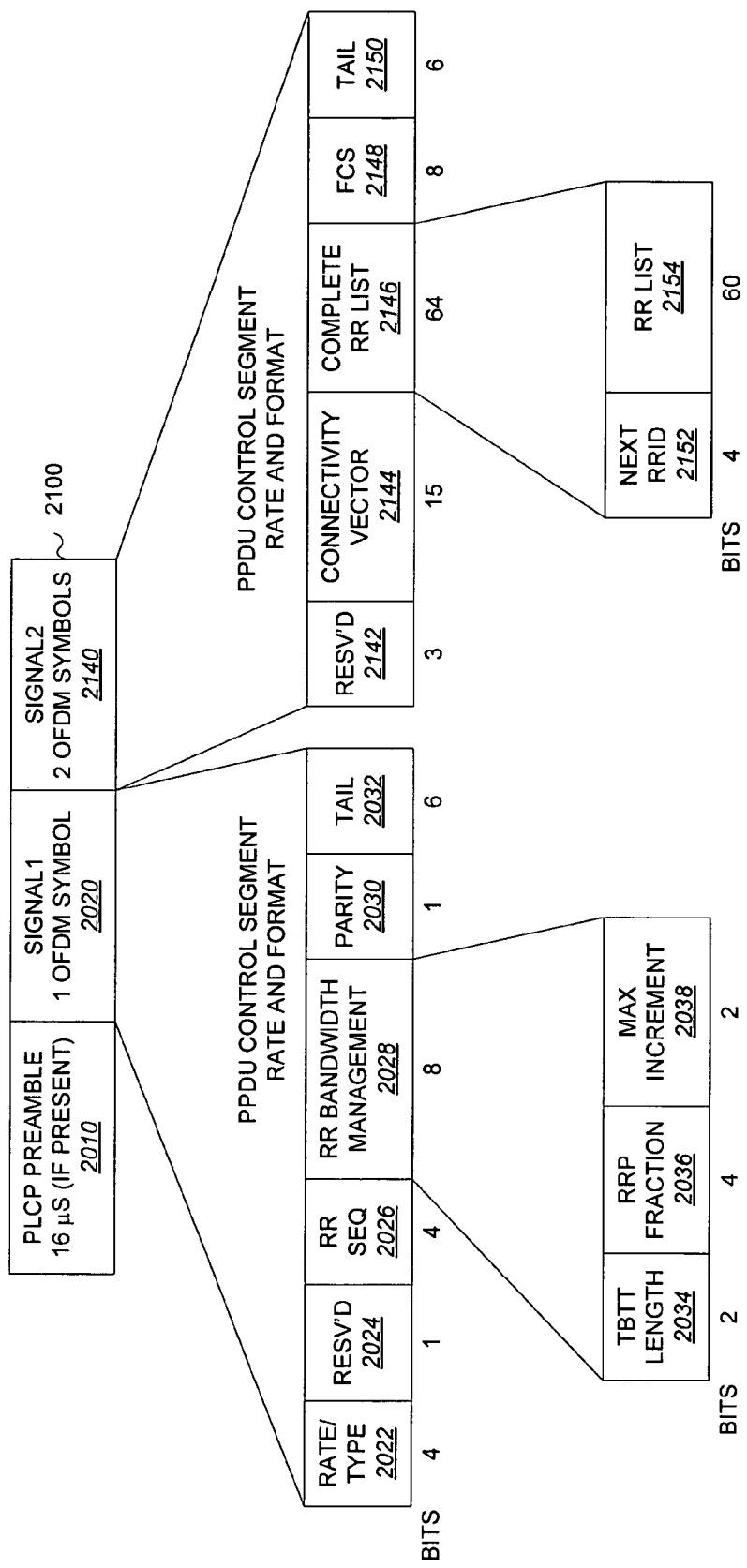
FIG. 21 is an example embodiment of a long token.

FIG. 20 is an example embodiment of a short token 2000. Short token PPDU 2000 comprises a Physical Layer Convergence Protocol (PLCP) preamble 2010 of 16 microseconds (when present), a SIGNAL 1 field 2020 of 1 OFDM symbol, and a SIGNAL2 field 2040 of 2 OFDM symbols. The extended SIGNAL fields are backward compatible with the SIGNAL field of legacy 802.11. Unused values of the RATE field in the legacy SIGNAL field are set to define new PPDU types. For backward compatibility with legacy STAs, the RATE field in the SIGNAL field of the PLCP Header is modified to a RATE/Type field. Unused values of RATE are designated as PPDU Type. The PPDU Type also indicates the presence and length of a SIGNAL field extension designated SIGNAL2. These values of the RATE/Type field are undefined for legacy STAs. Therefore, legacy STAs will abandon decoding of the PPDU after successfully decoding the SIGNAL1 field and finding an undefined value in the RATE field. An example system illustrating various embodiments with which the techniques detailed herein and the PPDUs described in FIGS. 20-21 are compatible is detailed in co-pending U.S. patent application Ser. No. 10/964,330, filed on Oct. 13, 2004, entitled "HIGH SPEED MEDIA ACCESS CONTROL WITH LEGACY SYSTEM INTEROPERABILITY", filed Oct. 13, 2004, assigned to the assignee of the present invention, and incorporated by reference herein.

The field widths for the example embodiment are given in parentheses with, each defined field. SIGNAL1 2020 comprises a RATE/Type field 2022 (4 bits), set to 1000 for the short token, a Reserved bit 2024, the RR Seq field 2026 (4 bits), the RR Bandwidth Management field 2028 (8 bits), Parity bit 2030, and Tail 2032 (6 bits). The RR Bandwidth Management Field comprises a TBTT Length 2034 (2 bits), an RRP Fraction 2036 (4 bits), and a Max Increment 2038 (2 bits). SIGNAL2 2040 comprises a Reserved bit 2042, the Compact RR List 2044 (12 bits), a Frame Check Sequence (FCS) 2046 (4 bits), and Tail 2048 (6 bits). The Compact RR List 2044 comprises the STA RRID 2050 (4 bits), the Next RRID 2052 (4 bits), and the Last RRID 2054 (4 bits).

Embodiments described above detail examples of the use of each of these fields. RR Seq 2026 tracks changes in the RR List. The RR Bandwidth Management field 2028 contains the following fields: The TBTT Length field 2034 identifies the length of the TBTT. Rules for changing the length of the TBTT are specified above, and may use the following encoding: 00: 512 symbols; 01: 1024 symbols; 10:1536 symbols; and 11: reserved.

The RRP Fraction 2036 defines the fraction of the TBTT permitted to be occupied by the RR STAs. Rules to determine RRP Fraction are specified above and may use the following encoding: step size $\frac{1}{32}$; minimum (and initial) value: $\frac{12}{32}$; and maximum value: $\frac{28}{32}$.

The Max Increment 2038 may be used as detailed above. RR STAs are permitted to increase the length of their TXOP by a factor (1+Max Increment) for the current Beacon interval compared to the previous Beacon interval. An example encoding is as follows: 00: 0; 01: $\frac{1}{32}$; 10: $\frac{1}{8}$; and 11: $-\frac{1}{32}$.

The Compact RR List 2044 contains three RRIDs from the RR List: RRID 2050 of the STA transmitting the Short Token, the RRID of the next STA 2052 on the RR schedule and the last STA 2054 on the RR schedule for the current Beacon interval. A 4 bit FCS 2046 is computed over the SIGNAL1 and SIGNAL2 fields.

FIG. 21 is an example embodiment of the Long Token PPDU 2100 (in which the RATE/Type filed 2022 is set to 1010). Most fields of the long token 2100 are identical to the short token 2000, and are like numbered. The additional or modified fields are described below.

SIGNAL2 2140 comprises a Reserved field 2142 (3 bits), the Connectivity Vector 2144 (15 bits); the Complete RR List 2146 (64 bits); an FCS 2148 (8 bits) computed over the SIGNAL1 and SIGNAL2 fields, and a Tail 2150 (6 bits). For each STA on the RR List whose transmitted token the STA is able to decode, the STA sets the corresponding bit in the Connectivity Vector 2144 to 1.

The Complete RR List 2146 replaces the Compact RR List 2044. The Complete RR List 2146 contains the RRID of the next STA 2152 (4 bits) and the RR List 2154 (60 bits) containing up to 15 RRIDs.

As described above, those of skill in the art will readily adapt these embodiments to include various alternate parameter sizes, fields, and message types. The long and short tokens are used in one example to illustrate the various RR procedures, and bandwidth conservation techniques. Different messages may contain different fields. Those of skill in the art will readily adapt varying message types to the procedures detailed above. An alternate embodiment is detailed further below for example.

In an alternate embodiment, a RR List Message and an RR Control message are defined. The RR List Message comprises the entire list of RRIDs, similar to the Long Token. As STAs join and leave the RR schedule, the changes are tracked through a global variable RR Change Sequence, similar to RR Seq. The RR Change Sequence is incremented every time a STA either joins or leaves the RR schedule. The RR Change Sequence is included as a field in the RR List message and the RR Control message. Alternately, the RR Change Sequence field may be included as a header field in each RR TXOP. A STA may explicitly indicate the end of an RR TXOP by transmitting a RR TXOP End frame (similar to the tokens defined above), which contains the RRID of the next STA on the RR schedule.

The RR Control message is a short message, similar in use to the short token, that indicates changes to the RR List during the TBTT. The RR Control message contains the RR Change Sequence field and a RR Bitmap field. Each bit of the RR Bitmap corresponds to the RRID entries in the RR List message. When a STA leaves the RR schedule, its entry in the RR Bitmap is set to 0 for the remainder of the TBTT. This allows subsequent STAs in the RR schedule to move up in the transmission order. Note that, since the RR Control message is quite short, it may be transmitted in every RR TXOP without much overhead. STA with an entry in the RR schedule should transmit at least one frame during its scheduled TXOP. If the STA does not have any buffered frames, it should transmit a RR List or RR Control message to maintain its position in the RR schedule.

When there is a change in the RR schedule during a TBTT, all subsequent STAs in the RR schedule may transmit either the RR List message or the RR Control message. This is taken care of automatically if every RR TXOP always contains the RR Control message. For robust operation, when there is a change in the RR schedule (i.e., either a new STA joins or a STA leaves the RR schedule), all STAs in the RR schedule transmit the RR List message at least once. This permits the RR List message to propagate throughout the RRBSS.

When there is no change in the RR schedule, only the first STA in the RR schedule is required to transmit the RR List message. Other STAs may transmit the RR List message during their RR TXOP, if necessary. All STAs may transmit the RR Control message. Those of skill in the art will readily adapt these alternate example messages to the procedures described above, replacing the long and short tokens as appropriate.

Two additional alternate bandwidth sharing and fairness embodiments are detailed below. In the first alternate method, when there are K STAs in the RR schedule (i.e. K entries in the RR List), the RR TXOP service quantum Q is defined as Q=r*TBTT/K. Here r is the maximum fraction of the TBTT interval available for the RRP. Values for r fall between $r_{min}$ and $r_{max}$ as discussed below.

In its turn in the RR schedule, each STA may use a TXOP of maximum length no more than length R. Initially the STA sets R[0]=Q.

The last STA on the RR schedule for the current TBTT interval notes the end of the RRP. There are two possible definitions of the fraction of the TBTT interval occupied by the RRP. The first, s_a, is the fraction of time occupied by the RRP in the TBTT interval. The second, s_b, is the fraction of the TBTT interval that has expired when the RRP ends. The difference may be due to legacy stations delaying the start of the TBTT interval. The assumed definition for discussion below is s_a, however either can be determined by the last STA on the RR schedule in the TBTT interval. In the next TBTF interval, this STA will be the first to transmit after the Beacon. The value s for the previous TBTT interval is included in the RR List message.

A STA that desires to increase its RR TXOP length per TBTT larger than R[i] for the next TBTT interval may use the following procedure. Then, in the next TBTT interval, the STA is permitted to increase its RR TXOP in TBTT interval i+1 to $R[i+1]<r_i \cdot R[i]/s_{i-1}$. The value of r itself is variable. It changes at each TBTR depending on the occupancy of the CP. The last STA to transmit during the RRP also monitors the CP so that it can update the value of r, as follows. The value of r is increased by 0.1 up to a maximum value of $r_{max}$, in every TBTT interval where the CP is left idle. For every busy CP, the value of r decreases by 0.02, but never below $r_{min}$. The RR List message contains the current value of r. Nominal values of variables: $r_{min}=0.4$ and $r_{max}=0.8$. Higher values may be used if the second definition of s=s_b is being used. Alternate parameters may be substituted in alternate embodiments.

Consider the following example, useful in describing the evolution of these variables. Consider the case where a single source, STA A, is transferring QoS data (e.g. video streams) to two sink STAs, B and C. STAs B and C generate only Block ACK traffic, as well as some application level control traffic. We assume that the STAs B and C each consume a fixed 0.05 fraction in each TBTT interval.

TABLE 1

Evolution of the variables r, s and the fraction of the TBTT interval available to the source

| TBTT interval (i) | $r_i$ | $R_A[i] = R_A[i-1]*r_i/s_{i-1}$ | $R_B, R_C$ | $S_i$ |
|---|---|---|---|---|
| 1 | 0.4 ($r_{min}$) | 0.13 | 0.13, 0.13 | 0.13 + 0.05 + 0.05 = 0.23 |
| 2 | 0.5 | 0.28 = (0.13*0.5/0.23) | 0.05, 0.05 | 0.28 + 0.05 + 0.05 = 0.38 |
| 3 | 0.6 | 0.44 = (0.28*0.6/0.38) | 0.05, 0.05 | 0.44 + 0.05 + 0.05 = 0.54 |
| 4 | 0.7 | 0.57 = (0.44*0.7/0.54) | 0.05, 0.05 | 0.57 + 0.05 + 0.05 = 0.67 |
| 5 | 0.8 ($r_{min}$) | 0.68 = (0.57*0.8/0.67) | 0.05, 0.05 | 0.68 + 0.05 + 0.05 = 0.78 |
| 6 | 0.8 | 0.69 = (0.68*0.8/0.78) | 0.05, 0.05 | 0.69 + 0.05 + 0.05 = 0.79 |

Table 1 shows the evolution of r, $R_A$, $R_B$, $R_C$ and s as described above. We see from this example that within 5 TBTT intervals the source (STA A) can occupy almost 70% of the TBTT interval starting from 13% in the first TBTT interval. Thus the fairness criteria imposed through the parameters r and s cause little bandwidth wastage.

In the second alternate bandwidth sharing and fairness method, as with the first, there are K STAs in the RR schedule (i.e. K entries in the RR List), and the RR TXOP service quantum is defined as Q=r*TBTT/K. The value of Q changes only when the number of STAs on the RR schedule changes. The current value of r (or Q) is included in the RR List message.

As before, the RR List message contains the RR schedule for the current TBTT. Each STA on the RR schedule either explicitly or implicitly hands over the token to the next STA on the list. The next STA begins its RR TXOP transmission after waiting for an RRIFS period after the previous STA completed its RR TXOP. To maintain its entry on the RR schedule, the STA transmits during its scheduled RR TXOP.

When there is no data in its buffer, the STA may transmit either the RR List message or the RR Control message to maintain its RR schedule entry.

In this method of bandwidth sharing, during TBTT interval i, a STA with entry j on the RR schedule completes its guaranteed RR TXOP prior to TBTT[i]+b+(j−1)Q. Here b is the transmission time of the Beacon. Thus, if prior STAs on the RR schedule do not utilize their complete allocation of the service quantum Q, the $j^{th}$ STA may begin its transmission early, but it completes it before its scheduled completion time. This guarantees that each STA obtains at least the minimum quantum Q during each TBTT.

For fair access to unused bandwidth, instead of a rotation of the RR schedule at each TBTT, a random shuffle of the RR schedule at each TBTT may be employed.

When the last STA on the RR schedule transmits its RR TXOP End frame, the remainder of the MAC frame reverts to CP. However, in this example, three priority levels are introduced during the CP: High, Standard, and Low priority. High priority includes STAs on the RR schedule that fully utilized their guaranteed service quantum (Q) during this TBTT interval, and STAs on the RR schedule that deferred transmissions because they were unable to decode the most recent RR List or RR Control message during this TBTT. Standard priority includes STAs not participating in the RR schedule. Low priority includes STAs on the RR schedule that used less than the service quantum Q during their scheduled turn in this TBTT. In this embodiment, High priority STAs use RRIFS and a short backoff. Standard priority STAs use DIFS and standard DCF backoff. Low priority STAs use a Low Priority Inter-frame Spacing (LIFS) that is longer than the DIFS, and use a longer backoff.

When a STA that is on the RR schedule is successful in accessing the medium during the CP (using the high priority or low priority contention mechanisms), it may transmit up to a service quantum Q. Standard priority STAs should also limit their TXOP to Q, but this cannot be guaranteed for legacy STAs.

An alternate power save feature may be deployed with the second alternate bandwidth and fairness method, just described. Since the transmission of the RR TXOP may be followed by a Priority TXOP during the CP, power saving may be modified. In its RR or Priority TXOP, the STA indicates whether it will attempt any more transmissions to its correspondent STA during the remainder of the current TBTT interval. If no further transmissions are expected, the STA may sleep until the next TBTT.

As detailed above with respect to FIG. 19, at least once every S beacon periods, each STA stays out of power save mode. A STA with RRID A computes the value (A modulo S). At each TBTT, the STA computes (BSN modulo S) and, if this number is equal to (A modulo S), the STA does not go into power save mode until the next TBTT. This permits potential correspondent STAs to communicate with STA A during the CP. This feature, as before, is optional.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
   a memory for storing a sequence list;
   a receiver for receiving a first signal indicating transfer of control of a shared medium from a first remote station with an associated station identifier in the sequence list; and
   a transmitter for transmitting on the shared medium subsequent to receiving the signal, and for transmitting a second signal indicating transfer of control of the shared medium to a second remote station with an associated station identifier in the sequence list subsequent to expiration of a time allotment for control of the shared medium, wherein the second signal comprises a token selected from a plurality of token messages and wherein the selected token comprises the sequence list, wherein the second remote station receives the token, selects a station identifier for a monitoring station and transmits an add message comprising a new sequence list, the new sequence list comprising the station identifier for the monitoring station, wherein the add message is transmitted subsequent to transmission by a third remote station of a token indicating the end to a period of transmissions associated with the sequence list, when the transmission from the third station is received and decoded by the station transmitting the add message.

2. The apparatus of claim 1, wherein:

the receiver further receives one or more signals from one or more remote stations, and further comprising:

a message decoder for decoding messages received from one or more remote stations; a processor for:

selecting a station identifier for association with the apparatus;

extracting the sequence list from a message decoded in the message decoder and storing the sequence list in the memory;

generating and updating a receive connectivity list indicating remote stations on the sequence list from which signals may be received and messages decoded, and storing the receive connectivity list in the memory;

generating and updating a forward connectivity list indicating remote stations on the sequence list at which signals transmitted with the transmitter may be received and decoded, and storing the forward connectivity list in the memory; and receiving from the message decoder and conditionally updating a sequence identifier associated with the sequence list, and storing the sequence identifier in the memory; and a message generator for generating a token message for indicating transfer of control and delivering the token message to the transmitter for transmission.

3. A method of sharing a common medium comprising:

forming a sequence list comprising one or more station identifiers; and transmitting a token from a first station to a second station, in accordance with the sequence list, to pass control of the common medium from the first station to the second station, wherein transmitting the token comprises transmitting a token selected from a plurality of token messages and wherein the selected token comprises the sequence list, wherein the second station receives the token, selects a station identifier for a monitoring station and transmits an add message comprising a new sequence list, the new sequence list comprising the station identifier for the monitoring station, wherein the add message is transmitted subsequent to transmission by a third remote station of a token indicating the end to a period of transmissions associated with the sequence list, when the transmission from the third station is received and decoded by the station transmitting the add message.

4. The method of claim 3, wherein the plurality of token messages comprising a first token message and a second token message, the first token message shorter than the second token message.

5. The method of claim 4, wherein the first token message comprises:

a first station identifier associated with the first station transferring control; and a second station identifier associated with the second station receiving control, the second station identifier subsequent to the first station identifier in the sequence list.

6. The message of claim 5, wherein the first token message further comprises a third station identifier associated with a third station, the third station identifier the last station identifier in the sequence list.

7. The message of claim 6, wherein the first token message further comprises a bandwidth management field.

8. The method of claim 4, wherein the second token message comprises:

a station identifier associated with the second station receiving control; and the sequence list comprising station identifiers associated with a plurality of stations for sequentially accessing the common medium.

9. The message of claim 8, wherein the second token message further comprises a connectivity vector field.

10. The method of claim 3, wherein the first station transmitting on the shared medium during a sequence period is rotated during successive sequence periods.

11. The method of claim 3, wherein the forming a sequence list comprises:

earning access to the common medium;

selecting a first station identifier;

forming the sequence list with the first station identifier;

transmitting a token comprising the first station identifier;

monitoring the common medium for one or more add messages from one or more remote stations, each add message comprising a second station identifier associated with the respective remote stations; and adding one or more second station identifiers to the sequence list.

12. The method of claim 11, further comprising:

accessing the common medium following a first delay, the first delay shorter than one or more second delays associated with one or more alternate common medium access types; transmitting a beacon; and transmitting a token comprising the sequence list to a next remote station, the next remote station associated with a next station identifier on the sequence list.

13. The method of claim 3, further comprising:

transmitting a token from a first station comprising a receive connectivity list associated with that station, the receive connectivity list indicating receive capability from stations associated with station identifiers in the sequence list;

receiving the token at one or more second remote stations; and updating the forward connectivity list to indicate forward connectivity with the first station in each second remote station capable of decoding the token, and for which receive capability of the respective second station is indicated in the receive connectivity list of the first station.

14. The method of claim 3, further comprising:

monitoring at a first station signal transmissions from one or more second stations; and updating a receive connectivity list to indicate receive capability for each second station from which signal transmissions are received and decoded.

15. The method of claim 3, further comprising:
updating a sequence identifier when the sequence list is modified; and
transmitting a token comprising the sequence identifier and the modified sequence list.

16. The method of claim 15, further comprising:
receiving a series of one or more tokens at a third station, each token comprising a sequence identifier;
transmitting a token comprising the sequence list when the sequence identifier included in one of the one or more tokens is updated.

17. The method of claim 3, wherein the sequence identifier is updated when a station is added to the sequence list.

18. The method of claim 3, wherein the sequence identifier is updated when a station is removed from the sequence list.

19. The method of claim 3, wherein the sequence identifier is updated when the order of station identifiers in the sequence list is changed, other than a predefined periodic sequence list reordering.

20. The method of claim 19, wherein a predefined periodic sequence list reordering comprises shifting the station identifiers in the list one position toward the end of the list, and moving the last station identifier to the first position in the list.

21. The method of claim 19, wherein a predefined periodic sequence list reordering comprises a random shuffling of the order of station identifiers in the sequence list.

22. The method of claim 3, further comprising:
transmitting a token from a third station to a fourth station, the token comprising the sequence list modified to indicate a predefined value, other than the third station identifier, in the position associated with the third station in the sequence list;
removing the station identifier associated with the third station from the sequence list subsequent to receiving the transmitted token.

23. The method of claim 3, further comprising:
monitoring transmissions from one or more remote stations; and
removing the station identifier associated with one of the one or more remote stations when the respective remote station fails to utilize a transmission opportunity within a predetermined time period.

24. The method of claim 23, wherein the removing comprises transmitting a token comprising the sequence list modified to indicate a predefined value, other than the respective station identifier, in the sequence list in the position associated with the remote station failing to utilize the transmission opportunity.

25. The method of claim 3, further comprising:
monitoring transmissions from the one or more remote stations indicated in the sequence list, wherein the sequence list comprises one or more station identifiers associated with the one or more remote stations.

26. The method of claim 25, wherein the add message is transmitted subsequent to a period of the transmissions associated with the sequence list.

27. A method comprising:
transmitting a token from a first station with access to a shared medium to a second station according to a list of one or more stations sharing the shared medium in sequence,
wherein transmitting the token comprises transmitting a token selected from a plurality of token messages and wherein the selected token comprises the sequence list; and
transferring control of the shared access to the second station after the token is transmitted,
wherein the second station receives the token, selects a station identifier for a monitoring station and transmits an add message comprising a new sequence list, the new sequence list comprising the station identifier for the monitoring station,
wherein the add message is transmitted subsequent to transmission by a third remote station of a token indicating the end to a period of transmissions associated with the sequence list, when the transmission from the third station is received and decoded by the station transmitting the add message.

28. The method of claim 27, wherein the token is a message comprising the list of one or more stations sharing the shared medium in sequence.

29. The method of claim 27, wherein the token is a message comprising a sequence identifier.

30. The method of claim 27, wherein the token is a message comprising an identifier of the last station in a list of one or more stations sharing the shared medium in sequence.

31. The method of claim 27, wherein the second station is selected from the list as the station subsequent to the first station in the list.

32. The method of claim 27, wherein the token is transmitted subsequent to one or more data transmissions between the first station and one or more remote stations.

33. The method of claim 27, further comprising transmission by the second station to one or more remote stations subsequent to receiving the token.

34. The method of claim 33, further comprising transmission of a token indicating the end of a sequence.

35. The method of claim 27, further comprising reclaiming access to the shared medium with the first station if the second station fails to transmit on the shared medium within a predetermined time period subsequent to control transfer.

36. A basic service set (BSS) comprising:
a plurality of stations sharing access to a common medium; and
token-passing means for sequential service of flows from one or more of the plurality of stations according to a list comprising identifiers corresponding to the one or more of the plurality of stations,
wherein the token passing means is configured to select a token to pass from a plurality of token messages and wherein the selected token comprises the list,
wherein a receiving station receives the token, selects a station identifier for a monitoring station and transmits an add message comprising a new sequence list, the new sequence list comprising the station identifier for the monitoring station,
wherein the add message is transmitted subsequent to transmission by a third remote station of a token indicating the end to a period of transmissions associated with the sequence list, when the transmission from the third station is received and decoded by the station transmitting the add message.

37. In a wireless network, comprising one or more stations sharing a common medium, a method comprising:
accessing the medium in a series of time segments, the segments delineated by a first signal;
transmitting a second signal on the shared medium from a first station after a first delay following the transmission of the first signal, the first delay less than one or more second delays employed by one or more remote stations,
wherein first station transmits after the first delay based on the first station having a token for accessing the medium and wherein the one or more second delays is associated with one or more alternate common medium access types, the second signal comprising a token message for transferring control of the shared medium to a second station, wherein the token message comprises a list of one or more stations sharing the medium;

wherein a receiving station receives the token comprising a sequence list, selects a station identifier for a monitoring station and transmits an add message comprising a new sequence list, the new sequence list comprising the station identifier for the monitoring station, wherein the add message is transmitted subsequent to transmission by a third remote station of a token indicating the end to a period of transmissions associated with the sequence list, when the transmission from the third station is received and decoded by the station transmitting the add message.

38. The method of claim 37, the second signal further comprising one or more transmissions between the first station and one or more third remote stations prior to token message transmission.

39. An apparatus comprising:

means for forming a sequence list comprising one or more station identifiers; and means for transmitting a token from a first station to a second station, in accordance with the sequence list, to pass control of a common medium from the first station to the second station, wherein the token transmitting means is configured to select a token from a plurality of token messages and wherein the selected token comprises the sequence list, wherein the second station receives the token, selects a station identifier for a monitoring station and transmits an add message comprising a new sequence list, the new sequence list comprising the station identifier for the monitoring station, wherein the add message is transmitted subsequent to transmission by a third remote station of a token indicating the end to a period of transmissions associated with the sequence list, when the transmission from the third station is received and decoded by the station transmitting the add message.

40. An apparatus comprising:

means for transmitting a token from a first station with access to a shared medium to a second station according to a list of one or more stations sharing the shared medium in sequence, wherein the token transmitting means is configured to select a token from a plurality of token messages and wherein the selected token comprises the list of one or more stations; and means for transferring control of the shared access to the second station after the token is transmitted, wherein the second station receives the token, selects a station identifier for a monitoring station and transmits an add message comprising a new sequence list, the new sequence list comprising the station identifier for the monitoring station, wherein the add message is transmitted subsequent to transmission by a third remote station of a token indicating the end to a period of transmissions associated with the sequence list, when the transmission from the third station is received and decoded by the station transmitting the add message.

41. Non-transitory computer readable media operable to perform:

forming a sequence list comprising one or more station identifiers; and transmitting a token from a first station to a second station, in accordance with the sequence list, to pass control of a common medium from the first station to the second station, wherein transmitting the token comprises transmitting a token selected from a plurality of token messages and wherein the selected token comprises the sequence list, wherein the second station receives the token, selects a station identifier for a monitoring station and transmits an add message comprising a new sequence list, the new sequence list comprising the station identifier for the monitoring station, wherein the add message is transmitted subsequent to transmission by a third remote station of a token indicating the end to a period of transmissions associated with the sequence list, when the transmission from the third station is received and decoded by the station transmitting the add message.

\* \* \* \* \*